US012485335B2

(12) United States Patent
Toles et al.

(10) Patent No.: US 12,485,335 B2
(45) Date of Patent: Dec. 2, 2025

(54) TREADMILL KARAOKE

(71) Applicant: iFIT Inc., Logan, UT (US)

(72) Inventors: George Samuel Toles, Salt Lake City, UT (US); Isabelle Ellen Staples, Logan, UT (US)

(73) Assignee: iFIT Inc., Logan, UT (US)

( * ) Notice: Subject to any disclaimer, the term of this patent is extended or adjusted under 35 U.S.C. 154(b) by 47 days.

(21) Appl. No.: 18/096,855

(22) Filed: Jan. 13, 2023

(65) Prior Publication Data

US 2023/0218975 A1 Jul. 13, 2023

Related U.S. Application Data

(60) Provisional application No. 63/299,357, filed on Jan. 13, 2022.

(51) Int. Cl.
| | |
|---|---|
| *A63B 71/06* | (2006.01) |
| *A63B 22/02* | (2006.01) |
| *A63B 24/00* | (2006.01) |
| *G11B 27/036* | (2006.01) |
| *H04N 7/00* | (2011.01) |

(52) U.S. Cl.
CPC ........ *A63B 71/0622* (2013.01); *A63B 22/025* (2015.10); *G11B 27/036* (2013.01); *H04N 7/002* (2013.01); *A63B 2024/009* (2013.01); *A63B 2071/0625* (2013.01); *A63B 2071/0644* (2013.01)

(58) Field of Classification Search
CPC .............. A63B 71/0622; A63B 22/025; A63B 2024/009; A63B 2071/0625; A63B 2071/0644; A63B 2024/0081; G11B 27/036; G11B 27/11; H04N 7/002; H04N 21/414; H04N 21/478; H04N 21/8113; H04N 21/854
See application file for complete search history.

(56) References Cited

U.S. PATENT DOCUMENTS

| | | | |
|---|---|---|---|
| 3,123,646 | A | 3/1964 | Easton |
| 3,579,339 | A | 5/1971 | Chang et al. |
| 4,023,795 | A | 5/1977 | Pauls |
| 4,300,760 | A | 11/1981 | Bobroff |
| D286,311 | S | 10/1986 | Martinell et al. |
| 4,681,318 | A | 7/1987 | Lay |
| 4,684,126 | A | 8/1987 | Dalebout et al. |

(Continued)

OTHER PUBLICATIONS

U.S. Appl. No. 17/066,485, filed Oct. 9, 2020, Weston et al.

(Continued)

*Primary Examiner* — Kyu Chae
(74) *Attorney, Agent, or Firm* — Holland & Hart LLP

(57) ABSTRACT

A method for controlling a treadmill using a workout video comprising receiving a workout video at a treadmill comprising a display, an endless belt, one or more actuators configured to control a speed and incline of the endless belt, and one or more processors. The method may also include displaying, by the one or more processors, the workout video on the display, wherein the workout video includes audio of a song, text of lyrics of the song, and an indication of progress through the lyrics. The method may also include controlling, by the one or more processors, actuators of the treadmill according to control signals associated with the workout video.

17 Claims, 10 Drawing Sheets

(56) References Cited

U.S. PATENT DOCUMENTS

| | | |
|---|---|---|
| 4,728,102 A | 3/1988 | Pauls |
| 4,750,736 A | 6/1988 | Watterson |
| 4,796,881 A | 1/1989 | Watterson |
| 4,813,667 A | 3/1989 | Watterson |
| 4,830,371 A | 5/1989 | Lay |
| 4,844,451 A | 7/1989 | Bersonnet et al. |
| 4,850,585 A | 7/1989 | Dalebout et al. |
| D304,849 S | 11/1989 | Watterson |
| 4,880,225 A | 11/1989 | Lucas et al. |
| 4,883,272 A | 11/1989 | Lay |
| D306,468 S | 3/1990 | Watterson |
| D306,891 S | 3/1990 | Watterson |
| 4,913,396 A | 4/1990 | Dalebout et al. |
| D307,614 S | 5/1990 | Bingham et al. |
| D307,615 S | 5/1990 | Bingham et al. |
| 4,921,242 A | 5/1990 | Watterson |
| 4,932,650 A | 6/1990 | Bingham et al. |
| D309,167 S | 7/1990 | Griffin |
| D309,485 S | 7/1990 | Bingham et al. |
| 4,938,478 A | 7/1990 | Lay |
| D310,253 S | 8/1990 | Bersonnet et al. |
| 4,955,599 A | 9/1990 | Bersonnet et al. |
| 4,971,316 A | 11/1990 | Dalebout et al. |
| D313,055 S | 12/1990 | Watterson |
| 4,974,832 A | 12/1990 | Dalebout |
| 4,979,737 A | 12/1990 | Kock |
| 4,981,294 A | 1/1991 | Dalebout et al. |
| D315,765 S | 3/1991 | Measom et al. |
| 4,998,725 A | 3/1991 | Watterson et al. |
| 5,000,442 A | 3/1991 | Dalebout et al. |
| 5,000,443 A | 3/1991 | Dalebout et al. |
| 5,000,444 A | 3/1991 | Dalebout et al. |
| D316,124 S | 4/1991 | Dalebout et al. |
| 5,013,033 A | 5/1991 | Watterson et al. |
| 5,014,980 A | 5/1991 | Bersonnet et al. |
| 5,016,871 A | 5/1991 | Dalebout et al. |
| D318,085 S | 7/1991 | Jacobson et al. |
| D318,086 S | 7/1991 | Bingham et al. |
| D318,699 S | 7/1991 | Jacobson et al. |
| 5,029,801 A | 7/1991 | Dalebout et al. |
| 5,034,576 A | 7/1991 | Dalebout et al. |
| 5,058,881 A | 10/1991 | Measom |
| 5,058,882 A | 10/1991 | Dalebout et al. |
| D321,388 S | 11/1991 | Dalebout |
| 5,062,626 A | 11/1991 | Dalebout et al. |
| 5,062,627 A | 11/1991 | Bingham |
| 5,062,632 A | 11/1991 | Dalebout et al. |
| 5,062,633 A | 11/1991 | Engel et al. |
| 5,067,710 A | 11/1991 | Watterson et al. |
| 5,072,929 A | 12/1991 | Peterson et al. |
| D323,009 S | 1/1992 | Dalebout et al. |
| D323,198 S | 1/1992 | Dalebout et al. |
| D323,199 S | 1/1992 | Dalebout et al. |
| D323,863 S | 2/1992 | Watterson |
| 5,088,729 A | 2/1992 | Dalebout |
| 5,090,694 A | 2/1992 | Pauls et al. |
| 5,102,380 A | 4/1992 | Jacobson et al. |
| 5,104,120 A | 4/1992 | Watterson et al. |
| 5,108,093 A | 4/1992 | Watterson |
| D326,491 S | 5/1992 | Dalebout |
| 5,122,105 A | 6/1992 | Engel et al. |
| 5,135,216 A | 8/1992 | Bingham et al. |
| 5,147,265 A | 9/1992 | Pauls et al. |
| 5,149,084 A | 9/1992 | Dalebout et al. |
| 5,149,312 A | 9/1992 | Croft et al. |
| 5,171,196 A | 12/1992 | Lynch |
| D332,347 S | 1/1993 | Raadt et al. |
| 5,190,505 A | 3/1993 | Dalebout et al. |
| 5,192,255 A | 3/1993 | Dalebout et al. |
| 5,195,937 A | 3/1993 | Engel et al. |
| 5,203,826 A | 4/1993 | Dalebout |
| D335,511 S | 5/1993 | Engel et al. |
| D335,905 S | 5/1993 | Cutter et al. |
| D336,498 S | 6/1993 | Engel et al. |
| 5,217,487 A | 6/1993 | Engel et al. |
| D337,361 S | 7/1993 | Engel et al. |
| D337,666 S | 7/1993 | Peterson et al. |
| D337,799 S | 7/1993 | Cutter et al. |
| 5,226,866 A | 7/1993 | Engel et al. |
| 5,244,446 A | 9/1993 | Engel et al. |
| 5,247,853 A | 9/1993 | Dalebout |
| 5,259,611 A | 11/1993 | Dalebout et al. |
| D342,106 S | 12/1993 | Campbell et al. |
| 5,279,528 A | 1/1994 | Dalebout et al. |
| D344,112 S | 2/1994 | Smith |
| D344,557 S | 2/1994 | Ashby |
| 5,282,776 A | 2/1994 | Dalebout |
| 5,295,931 A | 3/1994 | Dreibelbis et al. |
| 5,302,161 A | 4/1994 | Loubert et al. |
| D347,251 S | 5/1994 | Dreibelbis et al. |
| 5,316,534 A | 5/1994 | Dalebout et al. |
| D348,493 S | 7/1994 | Ashby |
| D348,494 S | 7/1994 | Ashby |
| 5,328,164 A | 7/1994 | Soga |
| D349,931 S | 8/1994 | Bostic et al. |
| 5,336,142 A | 8/1994 | Dalebout et al. |
| 5,344,376 A | 9/1994 | Bostic et al. |
| D351,202 S | 10/1994 | Bingham |
| D351,435 S | 10/1994 | Peterson et al. |
| D351,633 S | 10/1994 | Bingham |
| D352,534 S | 11/1994 | Dreibelbis et al. |
| D353,422 S | 12/1994 | Bostic et al. |
| 5,372,559 A | 12/1994 | Dalebout et al. |
| 5,374,228 A | 12/1994 | Buisman et al. |
| 5,382,221 A | 1/1995 | Hsu et al. |
| 5,387,168 A | 2/1995 | Bostic |
| 5,393,690 A | 2/1995 | Fu et al. |
| D356,128 S | 3/1995 | Smith et al. |
| 5,409,435 A | 4/1995 | Daniels |
| 5,429,563 A | 7/1995 | Engel et al. |
| 5,431,612 A | 7/1995 | Holden |
| D360,915 S | 8/1995 | Bostic et al. |
| 5,468,205 A | 11/1995 | McFall et al. |
| 5,489,249 A | 2/1996 | Brewer et al. |
| 5,492,517 A | 2/1996 | Bostic et al. |
| D367,689 S | 3/1996 | Wilkinson et al. |
| 5,511,740 A | 4/1996 | Loubert et al. |
| 5,512,025 A | 4/1996 | Dalebout et al. |
| D370,949 S | 6/1996 | Furner |
| D371,176 S | 6/1996 | Furner |
| 5,527,245 A | 6/1996 | Dalebout et al. |
| 5,529,553 A | 6/1996 | Finlayson |
| 5,540,429 A | 7/1996 | Dalebout et al. |
| 5,549,533 A | 8/1996 | Olson et al. |
| 5,554,085 A | 9/1996 | Dalebout |
| 5,569,128 A | 10/1996 | Dalebout |
| 5,591,105 A | 1/1997 | Dalebout et al. |
| 5,591,106 A | 1/1997 | Dalebout et al. |
| 5,595,556 A | 1/1997 | Dalebout et al. |
| 5,607,375 A | 3/1997 | Dalebout et al. |
| 5,611,539 A | 3/1997 | Watterson et al. |
| 5,622,527 A | 4/1997 | Watterson et al. |
| 5,626,538 A | 5/1997 | Dalebout et al. |
| 5,626,542 A | 5/1997 | Dalebout et al. |
| D380,024 S | 6/1997 | Novak et al. |
| 5,637,059 A | 6/1997 | Dalebout |
| D380,509 S | 7/1997 | Wilkinson et al. |
| 5,643,153 A | 7/1997 | Nylen et al. |
| 5,645,509 A | 7/1997 | Brewer et al. |
| D384,118 S | 9/1997 | Deblauw |
| 5,662,557 A | 9/1997 | Watterson et al. |
| 5,669,857 A | 9/1997 | Watterson et al. |
| 5,672,140 A | 9/1997 | Watterson et al. |
| 5,674,156 A | 10/1997 | Watterson et al. |
| 5,674,453 A | 10/1997 | Watterson et al. |
| 5,676,624 A | 10/1997 | Watterson et al. |
| 5,683,331 A | 11/1997 | Dalebout |
| 5,683,332 A | 11/1997 | Watterson et al. |
| D387,825 S | 12/1997 | Fleck et al. |
| 5,695,433 A | 12/1997 | Buisman |
| 5,695,434 A | 12/1997 | Dalebout et al. |
| 5,695,435 A | 12/1997 | Dalebout et al. |
| 5,702,325 A | 12/1997 | Watterson et al. |
| 5,704,879 A | 1/1998 | Watterson et al. |

(56) References Cited

U.S. PATENT DOCUMENTS

| | | | |
|---|---|---|---|
| 5,718,657 | A | 2/1998 | Dalebout et al. |
| 5,720,200 | A | 2/1998 | Anderson et al. |
| 5,720,698 | A | 2/1998 | Dalebout et al. |
| D392,006 | S | 3/1998 | Dalebout et al. |
| 5,722,922 | A | 3/1998 | Watterson et al. |
| 5,733,229 | A | 3/1998 | Dalebout et al. |
| 5,743,833 | A | 4/1998 | Watterson et al. |
| 5,762,584 | A | 6/1998 | Daniels |
| 5,762,587 | A | 6/1998 | Dalebout et al. |
| 5,772,560 | A | 6/1998 | Watterson et al. |
| 5,810,698 | A | 9/1998 | Hullett et al. |
| 5,827,155 | A | 10/1998 | Jensen et al. |
| 5,830,114 | A | 11/1998 | Halfen et al. |
| 5,860,893 | A | 1/1999 | Watterson et al. |
| 5,860,894 | A | 1/1999 | Dalebout et al. |
| 5,899,834 | A | 5/1999 | Dalebout et al. |
| D412,953 | S | 8/1999 | Armstrong |
| D413,948 | S | 9/1999 | Dalebout |
| 5,951,441 | A | 9/1999 | Dalebout et al. |
| 5,951,448 | A | 9/1999 | Bolland |
| D416,596 | S | 11/1999 | Armstrong |
| 6,003,166 | A | 12/1999 | Hald et al. |
| 6,019,710 | A | 2/2000 | Dalebout et al. |
| 6,027,429 | A | 2/2000 | Daniels |
| 6,033,347 | A | 3/2000 | Dalebout et al. |
| D425,940 | S | 5/2000 | Halfen et al. |
| 6,059,692 | A | 5/2000 | Hickman |
| D428,949 | S | 8/2000 | Simonson |
| 6,123,646 | A | 9/2000 | Colassi |
| 6,171,217 | B1 | 1/2001 | Cutler |
| 6,171,219 | B1 | 1/2001 | Simonson |
| 6,174,267 | B1 | 1/2001 | Dalebout et al. |
| 6,193,631 | B1 | 2/2001 | Hickman |
| 6,228,003 | B1 | 5/2001 | Hald et al. |
| 6,238,323 | B1 | 5/2001 | Simonson |
| 6,251,052 | B1 | 6/2001 | Simonson |
| 6,261,022 | B1 | 7/2001 | Dalebout et al. |
| 6,280,362 | B1 | 8/2001 | Dalebout et al. |
| 6,296,594 | B1 | 10/2001 | Simonson |
| D450,872 | S | 11/2001 | Dalebout et al. |
| 6,312,363 | B1 | 11/2001 | Watterson et al. |
| D452,338 | S | 12/2001 | Dalebout et al. |
| D453,543 | S | 2/2002 | Cutler |
| D453,948 | S | 2/2002 | Cutler |
| 6,350,218 | B1 | 2/2002 | Dalebout et al. |
| 6,387,020 | B1 | 5/2002 | Simonson |
| 6,413,191 | B1 | 7/2002 | Harris et al. |
| 6,422,980 | B1 | 7/2002 | Simonson |
| 6,447,424 | B1 | 9/2002 | Ashby et al. |
| 6,458,060 | B1 | 10/2002 | Watterson et al. |
| 6,458,061 | B2 | 10/2002 | Simonson |
| 6,471,622 | B1 | 10/2002 | Hammer et al. |
| 6,563,225 | B2 | 5/2003 | Soga et al. |
| 6,601,016 | B1 | 7/2003 | Brown et al. |
| 6,605,020 | B1 * | 8/2003 | Huang ............... A63B 22/0242 482/7 |
| 6,623,140 | B2 | 9/2003 | Watterson et al. |
| 6,626,799 | B2 | 9/2003 | Watterson et al. |
| 6,652,424 | B2 | 11/2003 | Dalebout |
| 6,685,607 | B1 | 2/2004 | Olson |
| 6,695,581 | B2 | 2/2004 | Wasson et al. |
| 6,701,271 | B2 | 3/2004 | Willner et al. |
| 6,702,719 | B1 | 3/2004 | Brown et al. |
| 6,712,740 | B2 | 3/2004 | Simonson |
| 6,730,002 | B2 | 5/2004 | Hald et al. |
| 6,743,153 | B2 | 6/2004 | Watterson et al. |
| 6,746,371 | B1 | 6/2004 | Brown et al. |
| 6,749,537 | B1 | 6/2004 | Hickman |
| 6,761,667 | B1 | 7/2004 | Cutler et al. |
| 6,770,015 | B2 | 8/2004 | Simonson |
| 6,786,852 | B2 | 9/2004 | Watterson et al. |
| 6,808,472 | B1 | 10/2004 | Hickman |
| 6,821,230 | B2 | 11/2004 | Dalebout et al. |
| 6,830,540 | B2 | 12/2004 | Watterson et al. |
| 6,863,641 | B1 | 3/2005 | Brown et al. |
| 6,866,613 | B1 | 3/2005 | Brown et al. |
| 6,875,160 | B2 | 4/2005 | Watterson et al. |
| D507,311 | S | 7/2005 | Butler et al. |
| 6,918,858 | B2 | 7/2005 | Watterson et al. |
| 6,921,351 | B1 | 7/2005 | Hickman et al. |
| 6,974,404 | B1 | 12/2005 | Watterson et al. |
| 6,997,852 | B2 | 2/2006 | Watterson et al. |
| 7,025,713 | B2 | 4/2006 | Dalebout et al. |
| D520,085 | S | 5/2006 | Willardson et al. |
| 7,044,897 | B2 | 5/2006 | Myers et al. |
| 7,052,442 | B2 | 5/2006 | Watterson et al. |
| 7,060,006 | B1 | 6/2006 | Watterson et al. |
| 7,060,008 | B2 | 6/2006 | Watterson et al. |
| 7,070,539 | B2 | 7/2006 | Brown et al. |
| 7,097,588 | B2 | 8/2006 | Watterson et al. |
| D527,776 | S | 9/2006 | Willardson et al. |
| 7,112,168 | B2 | 9/2006 | Dalebout et al. |
| 7,128,693 | B2 | 10/2006 | Brown et al. |
| 7,166,062 | B1 | 1/2007 | Watterson et al. |
| 7,166,064 | B2 | 1/2007 | Watterson et al. |
| 7,169,087 | B2 | 1/2007 | Ercanbrack et al. |
| 7,169,093 | B2 | 1/2007 | Simonson et al. |
| 7,192,388 | B2 | 3/2007 | Dalebout et al. |
| 7,250,022 | B2 | 7/2007 | Dalebout et al. |
| 7,282,016 | B2 | 10/2007 | Simonson |
| 7,285,075 | B2 | 10/2007 | Cutler et al. |
| 7,344,481 | B2 | 3/2008 | Watterson et al. |
| 7,377,882 | B2 | 5/2008 | Watterson et al. |
| 7,425,188 | B2 | 9/2008 | Ercanbrack et al. |
| 7,429,236 | B2 | 9/2008 | Dalebout et al. |
| 7,455,622 | B2 | 11/2008 | Watterson et al. |
| 7,482,050 | B2 | 1/2009 | Olson |
| D588,655 | S | 3/2009 | Utykanski |
| 7,510,509 | B2 | 3/2009 | Hickman |
| 7,537,546 | B2 | 5/2009 | Watterson et al. |
| 7,537,549 | B2 | 5/2009 | Nelson et al. |
| 7,537,552 | B2 | 5/2009 | Dalebout et al. |
| 7,540,828 | B2 | 6/2009 | Watterson et al. |
| 7,549,947 | B2 | 6/2009 | Hickman et al. |
| 7,556,590 | B2 | 7/2009 | Watterson et al. |
| 7,563,203 | B2 | 7/2009 | Dalebout et al. |
| 7,575,536 | B1 | 8/2009 | Hickman |
| 7,601,105 | B1 | 10/2009 | Gipson et al. |
| 7,604,573 | B2 | 10/2009 | Dalebout et al. |
| D604,373 | S | 11/2009 | Dalebout et al. |
| 7,618,350 | B2 | 11/2009 | Dalebout et al. |
| 7,618,357 | B2 | 11/2009 | Dalebout et al. |
| 7,625,315 | B2 | 12/2009 | Hickman |
| 7,625,321 | B2 | 12/2009 | Simonson et al. |
| 7,628,730 | B1 | 12/2009 | Watterson et al. |
| 7,628,737 | B2 | 12/2009 | Kowallis et al. |
| 7,637,847 | B1 | 12/2009 | Hickman |
| 7,645,212 | B2 | 1/2010 | Ashby et al. |
| 7,645,213 | B2 | 1/2010 | Watterson et al. |
| 7,658,698 | B2 | 2/2010 | Pacheco et al. |
| 7,674,205 | B2 | 3/2010 | Dalebout et al. |
| 7,713,171 | B1 | 5/2010 | Hickman |
| 7,713,172 | B2 | 5/2010 | Watterson et al. |
| 7,713,180 | B2 | 5/2010 | Wickens et al. |
| 7,717,828 | B2 | 5/2010 | Simonson et al. |
| 7,736,279 | B2 | 6/2010 | Dalebout et al. |
| 7,740,563 | B2 | 6/2010 | Dalebout et al. |
| 7,749,144 | B2 | 7/2010 | Hammer |
| 7,766,797 | B2 | 8/2010 | Dalebout et al. |
| 7,771,329 | B2 | 8/2010 | Dalebout et al. |
| 7,775,940 | B2 | 8/2010 | Dalebout et al. |
| 7,789,800 | B1 | 9/2010 | Watterson et al. |
| 7,798,946 | B2 | 9/2010 | Dalebout et al. |
| 7,815,550 | B2 | 10/2010 | Watterson et al. |
| 7,857,731 | B2 | 12/2010 | Hickman et al. |
| 7,862,475 | B2 | 1/2011 | Watterson et al. |
| 7,862,478 | B2 | 1/2011 | Watterson et al. |
| 7,862,483 | B2 | 1/2011 | Hendrickson et al. |
| D635,207 | S | 3/2011 | Dalebout et al. |
| 7,901,330 | B2 | 3/2011 | Dalebout et al. |
| 7,909,740 | B2 | 3/2011 | Dalebout et al. |
| 7,980,996 | B2 | 7/2011 | Hickman |
| 7,981,000 | B2 | 7/2011 | Watterson et al. |
| 7,985,164 | B2 | 7/2011 | Ashby |

(56) References Cited

U.S. PATENT DOCUMENTS

| | | |
|---|---|---|
| 8,029,415 B2 | 10/2011 | Ashby et al. |
| 8,033,960 B1 | 10/2011 | Dalebout et al. |
| D650,451 S | 12/2011 | Olson et al. |
| D652,877 S | 1/2012 | Dalebout et al. |
| 8,152,702 B2 | 4/2012 | Pacheco |
| D659,775 S | 5/2012 | Olson et al. |
| D659,777 S | 5/2012 | Watterson et al. |
| D660,383 S | 5/2012 | Watterson et al. |
| D664,613 S | 7/2012 | Dalebout et al. |
| 8,251,874 B2 | 8/2012 | Ashby et al. |
| 8,298,123 B2 | 10/2012 | Hickman |
| 8,298,125 B2 | 10/2012 | Colledge et al. |
| D671,177 S | 11/2012 | Sip |
| D671,178 S | 11/2012 | Sip |
| D673,626 S | 1/2013 | Olson et al. |
| 8,690,735 B2 | 4/2014 | Watterson et al. |
| D707,763 S | 6/2014 | Cutler |
| 8,740,753 B2 | 6/2014 | Olson et al. |
| 8,758,201 B2 | 6/2014 | Ashby et al. |
| 8,771,153 B2 | 7/2014 | Dalebout et al. |
| 8,784,270 B2 | 7/2014 | Ashby et al. |
| 8,808,148 B2 | 8/2014 | Watterson et al. |
| 8,814,762 B2 | 8/2014 | Butler et al. |
| D712,493 S | 9/2014 | Ercanbrack et al. |
| 8,840,075 B2 | 9/2014 | Dalebout et al. |
| 8,845,493 B2 | 9/2014 | Watterson et al. |
| 8,870,726 B2 | 10/2014 | Watterson et al. |
| 8,876,668 B2 | 11/2014 | Hendrickson et al. |
| 8,894,549 B2 | 11/2014 | Colledge |
| 8,894,555 B2 | 11/2014 | Colledge et al. |
| 8,911,330 B2 | 12/2014 | Watterson et al. |
| 8,920,288 B2 | 12/2014 | Dalebout et al. |
| 8,986,165 B2 | 3/2015 | Ashby |
| 8,992,364 B2 | 3/2015 | Law et al. |
| 8,992,387 B2 | 3/2015 | Watterson et al. |
| D726,476 S | 4/2015 | Ercanbrack |
| 9,028,368 B2 | 5/2015 | Ashby et al. |
| 9,028,370 B2 | 5/2015 | Watterson et al. |
| 9,039,578 B2 | 5/2015 | Dalebout |
| D731,011 S | 6/2015 | Buchanan |
| 9,072,930 B2 | 7/2015 | Ashby et al. |
| 9,119,983 B2 | 9/2015 | Rhea |
| 9,123,317 B2 | 9/2015 | Watterson et al. |
| 9,126,071 B2 | 9/2015 | Smith |
| 9,126,072 B2 | 9/2015 | Watterson |
| 9,138,615 B2 | 9/2015 | Olson et al. |
| 9,142,139 B2 | 9/2015 | Watterson et al. |
| 9,144,703 B2 | 9/2015 | Dalebout et al. |
| 9,149,683 B2 | 10/2015 | Watterson et al. |
| 9,186,535 B2 | 11/2015 | Ercanbrack |
| 9,186,549 B2 | 11/2015 | Watterson et al. |
| 9,254,409 B2 | 2/2016 | Dalebout et al. |
| 9,254,416 B2 | 2/2016 | Ashby |
| 9,278,248 B2 | 3/2016 | Tyger et al. |
| 9,278,249 B2 | 3/2016 | Watterson |
| 9,278,250 B2 | 3/2016 | Buchanan |
| 9,289,648 B2 | 3/2016 | Watterson |
| 9,339,691 B2 | 5/2016 | Brammer |
| 9,352,185 B2 | 5/2016 | Hendrickson et al. |
| 9,352,186 B2 | 5/2016 | Watterson |
| 9,375,605 B2 | 6/2016 | Tyger et al. |
| 9,381,394 B2 | 7/2016 | Mortensen et al. |
| 9,387,387 B2 | 7/2016 | Dalebout |
| 9,393,453 B2 | 7/2016 | Watterson |
| 9,403,047 B2 | 8/2016 | Olson et al. |
| 9,403,051 B2 | 8/2016 | Cutler |
| 9,421,416 B2 | 8/2016 | Mortensen et al. |
| 9,457,219 B2 | 10/2016 | Smith |
| 9,457,220 B2 | 10/2016 | Olson |
| 9,457,222 B2 | 10/2016 | Dalebout |
| 9,460,632 B2 | 10/2016 | Watterson |
| 9,463,356 B2 | 10/2016 | Rhea |
| 9,468,794 B2 | 10/2016 | Barton |
| 9,468,798 B2 | 10/2016 | Dalebout |
| 9,480,874 B2 | 11/2016 | Cutler |
| 9,492,704 B2 | 11/2016 | Mortensen et al. |
| 9,498,668 B2 | 11/2016 | Smith |
| 9,517,378 B2 | 12/2016 | Ashby et al. |
| 9,521,901 B2 | 12/2016 | Dalebout |
| 9,533,187 B2 | 1/2017 | Dalebout |
| 9,539,461 B2 | 1/2017 | Ercanbrack |
| 9,579,544 B2 | 2/2017 | Watterson |
| 9,586,086 B2 | 3/2017 | Dalebout et al. |
| 9,586,090 B2 | 3/2017 | Watterson et al. |
| 9,604,099 B2 | 3/2017 | Taylor |
| 9,616,276 B2 | 4/2017 | Dalebout et al. |
| 9,616,278 B2 | 4/2017 | Olson |
| 9,623,281 B2 | 4/2017 | Hendrickson et al. |
| 9,636,567 B2 | 5/2017 | Brammer et al. |
| 9,675,839 B2 | 6/2017 | Dalebout et al. |
| 9,682,307 B2 | 6/2017 | Dalebout |
| 9,694,234 B2 | 7/2017 | Dalebout et al. |
| 9,694,242 B2 | 7/2017 | Ashby et al. |
| 9,737,755 B2 | 8/2017 | Dalebout |
| 9,757,605 B2 | 9/2017 | Olson et al. |
| 9,764,186 B2 | 9/2017 | Dalebout et al. |
| 9,767,785 B2 | 9/2017 | Ashby et al. |
| 9,795,822 B2 | 10/2017 | Smith et al. |
| 9,808,672 B2 | 11/2017 | Dalebout |
| 9,849,326 B2 | 12/2017 | Smith |
| 9,878,210 B2 | 1/2018 | Watterson |
| 9,889,334 B2 | 2/2018 | Ashby et al. |
| 9,889,339 B2 | 2/2018 | Douglass |
| 9,937,376 B2 | 4/2018 | McInelly et al. |
| 9,937,377 B2 | 4/2018 | McInelly et al. |
| 9,937,378 B2 | 4/2018 | Dalebout et al. |
| 9,937,379 B2 | 4/2018 | Mortensen et al. |
| 9,943,719 B2 | 4/2018 | Smith et al. |
| 9,943,722 B2 | 4/2018 | Dalebout |
| 9,948,037 B2 | 4/2018 | Ashby |
| 9,968,816 B2 | 5/2018 | Olson et al. |
| 9,968,821 B2 | 5/2018 | Finlayson et al. |
| 9,968,823 B2 | 5/2018 | Cutler |
| 10,010,755 B2 | 7/2018 | Watterson |
| 10,010,756 B2 | 7/2018 | Watterson |
| 10,029,145 B2 | 7/2018 | Douglass |
| D826,350 S | 8/2018 | Hochstrasser |
| 10,046,196 B2 | 8/2018 | Ercanbrack et al. |
| D827,733 S | 9/2018 | Hochstrasser |
| 10,065,064 B2 | 9/2018 | Smith et al. |
| 10,071,285 B2 | 9/2018 | Smith et al. |
| 10,085,586 B2 | 10/2018 | Smith et al. |
| 10,086,254 B2 | 10/2018 | Watterson |
| 10,136,842 B2 | 11/2018 | Ashby |
| 10,186,161 B2 | 1/2019 | Watterson |
| 10,188,890 B2 | 1/2019 | Olson et al. |
| 10,207,143 B2 | 2/2019 | Dalebout et al. |
| 10,207,145 B2 | 2/2019 | Tyger et al. |
| 10,207,147 B2 | 2/2019 | Ercanbrack et al. |
| 10,207,148 B2 | 2/2019 | Powell et al. |
| 10,212,994 B2 | 2/2019 | Watterson et al. |
| 10,220,259 B2 | 3/2019 | Brammer |
| 10,226,396 B2 | 3/2019 | Ashby |
| 10,226,664 B2 | 3/2019 | Dalebout et al. |
| 10,252,109 B2 | 4/2019 | Watterson |
| 10,258,828 B2 | 4/2019 | Dalebout et al. |
| 10,272,317 B2 | 4/2019 | Watterson |
| 10,279,212 B2 | 5/2019 | Dalebout et al. |
| 10,293,211 B2 | 5/2019 | Watterson et al. |
| D852,292 S | 6/2019 | Cutler |
| 10,343,017 B2 | 7/2019 | Jackson |
| 10,376,736 B2 | 8/2019 | Powell et al. |
| 10,388,183 B2 | 8/2019 | Watterson |
| 10,391,361 B2 | 8/2019 | Watterson |
| D864,320 S | 10/2019 | Weston |
| D864,321 S | 10/2019 | Weston |
| 10,426,989 B2 | 10/2019 | Dalebout |
| 10,433,612 B2 | 10/2019 | Ashby et al. |
| 10,441,840 B2 | 10/2019 | Dalebout |
| 10,441,844 B2 | 10/2019 | Powell |
| 10,449,416 B2 | 10/2019 | Dalebout et al. |
| 10,471,299 B2 | 11/2019 | Powell |
| D868,909 S | 12/2019 | Cutler et al. |
| 10,492,519 B2 | 12/2019 | Capell et al. |

(56) References Cited

U.S. PATENT DOCUMENTS

| | | |
|---|---|---|
| 10,493,349 B2 | 12/2019 | Watterson |
| 10,500,473 B2 | 12/2019 | Watterson |
| 10,537,764 B2 | 1/2020 | Smith et al. |
| 10,543,395 B2 | 1/2020 | Powell et al. |
| 10,561,877 B2 | 2/2020 | Workman |
| 10,561,893 B2 | 2/2020 | Chatterton et al. |
| 10,561,894 B2 | 2/2020 | Dalebout et al. |
| 10,569,121 B2 | 2/2020 | Watterson |
| 10,569,123 B2 | 2/2020 | Hochstrasser et al. |
| 10,625,114 B2 | 4/2020 | Ercanbrack |
| 10,625,137 B2 | 4/2020 | Dalebout et al. |
| 10,661,114 B2 | 5/2020 | Watterson et al. |
| 10,668,320 B2 | 6/2020 | Watterson |
| 10,671,705 B2 | 6/2020 | Capell et al. |
| 10,688,346 B2 | 6/2020 | Brammer |
| 10,702,736 B2 | 7/2020 | Weston et al. |
| 10,709,925 B2 | 7/2020 | Dalebout et al. |
| 10,726,730 B2 | 7/2020 | Watterson |
| 10,729,965 B2 | 8/2020 | Powell |
| 10,758,767 B2 | 9/2020 | Olson et al. |
| 10,786,706 B2 | 9/2020 | Smith |
| 10,864,407 B2 | 12/2020 | Watterson et al. |
| 10,918,905 B2 | 2/2021 | Powell et al. |
| 10,932,517 B2 | 3/2021 | Ashby et al. |
| 10,940,360 B2 | 3/2021 | Dalebout et al. |
| 10,953,268 B1 | 3/2021 | Dalebout et al. |
| 10,953,305 B2 | 3/2021 | Dalebout et al. |
| 10,967,214 B1 | 4/2021 | Olson et al. |
| 10,994,173 B2 | 5/2021 | Watterson |
| 11,000,730 B2 | 5/2021 | Dalebout et al. |
| 11,013,960 B2 | 5/2021 | Watterson et al. |
| 11,033,777 B1 | 6/2021 | Watterson et al. |
| 11,058,913 B2 | 7/2021 | Dalebout et al. |
| 11,058,914 B2 | 7/2021 | Powell |
| 11,058,918 B1 | 7/2021 | Watterson et al. |
| 11,187,285 B2 | 11/2021 | Wrobel |
| 11,298,577 B2 | 4/2022 | Watterson |
| 11,326,673 B2 | 5/2022 | Buchanan |
| 11,338,169 B2 | 5/2022 | Dalebout et al. |
| 11,338,175 B2 | 5/2022 | Watterson et al. |
| 11,426,633 B2 | 8/2022 | Watterson et al. |
| 11,451,108 B2 | 9/2022 | Tinney |
| 11,452,903 B2 | 9/2022 | Watterson |
| 11,511,152 B2 | 11/2022 | Powell et al. |
| 11,534,651 B2 | 12/2022 | Ercanbrack et al. |
| 11,534,654 B2 | 12/2022 | Silcock et al. |
| 11,534,655 B2 | 12/2022 | Dalebout et al. |
| 11,565,148 B2 | 1/2023 | Dalebout et al. |
| 11,596,830 B2 | 3/2023 | Dalebout et al. |
| 11,642,564 B2 | 5/2023 | Watterson |
| 11,673,036 B2 | 6/2023 | Dalebout et al. |
| 11,680,611 B2 | 6/2023 | Wrobel |
| 11,700,905 B2 | 7/2023 | Ashby et al. |
| 11,708,874 B2 | 7/2023 | Wrobel |
| 2007/0166683 A1* | 7/2007 | Chang .................. G09B 5/06 434/307 R |
| 2008/0051256 A1 | 2/2008 | Ashby et al. |
| 2010/0248900 A1* | 9/2010 | Ashby .................. A63B 22/02 482/4 |
| 2014/0344693 A1* | 11/2014 | Reese ................. G06F 3/04847 715/739 |
| 2015/0190677 A1* | 7/2015 | Alsalem ................. G16H 20/30 700/91 |
| 2015/0251055 A1 | 9/2015 | Ashby |
| 2016/0058335 A1 | 3/2016 | Ashby |
| 2016/0250519 A1* | 9/2016 | Watterson .......... A63B 24/0084 482/4 |
| 2016/0325145 A1* | 11/2016 | Pinkerton .......... A63B 24/0087 |
| 2016/0346595 A1 | 12/2016 | Dalebout et al. |
| 2017/0124912 A1 | 5/2017 | Ashby et al. |
| 2017/0193578 A1 | 7/2017 | Watterson |
| 2017/0266489 A1 | 9/2017 | Douglass et al. |
| 2017/0270820 A1 | 9/2017 | Ashby et al. |
| 2018/0056132 A1* | 3/2018 | Foley ................. A63B 23/0405 |
| 2018/0085630 A1 | 3/2018 | Capell et al. |
| 2018/0099116 A1 | 4/2018 | Ashby |
| 2018/0099180 A1 | 4/2018 | Wilkinson |
| 2018/0111034 A1 | 4/2018 | Watterson |
| 2019/0223612 A1 | 7/2019 | Watterson et al. |
| 2019/0269971 A1 | 9/2019 | Capell et al. |
| 2020/0009417 A1 | 1/2020 | Dalebout |
| 2020/0254311 A1* | 8/2020 | Watterson ............ A63B 22/025 |
| 2020/0368575 A1 | 11/2020 | Hays et al. |
| 2020/0391069 A1 | 12/2020 | Olson et al. |
| 2021/0001177 A1 | 1/2021 | Smith |
| 2021/0046353 A1 | 2/2021 | Dalebout et al. |
| 2021/0106899 A1 | 4/2021 | Willardson et al. |
| 2021/0110910 A1 | 4/2021 | Ostler et al. |
| 2021/0146221 A1 | 5/2021 | Dalebout et al. |
| 2021/0213331 A1 | 7/2021 | Watterson |
| 2021/0268336 A1 | 9/2021 | Watterson et al. |
| 2021/0291013 A1 | 9/2021 | Nascimento |
| 2021/0299518 A1 | 9/2021 | Brammer et al. |
| 2021/0299542 A1 | 9/2021 | Brammer et al. |
| 2021/0339079 A1 | 11/2021 | Dalebout et al. |
| 2022/0062685 A1 | 3/2022 | Ashby et al. |
| 2022/0104992 A1 | 4/2022 | Ashby |
| 2022/0212052 A1 | 7/2022 | Ercanbrack et al. |
| 2022/0241649 A1 | 8/2022 | Ashby |
| 2022/0241665 A1 | 8/2022 | Dalebout et al. |
| 2022/0241668 A1 | 8/2022 | Willardson et al. |
| 2022/0249912 A1 | 8/2022 | Watterson et al. |
| 2022/0257994 A1 | 8/2022 | Smith |
| 2022/0258007 A1 | 8/2022 | Watterson et al. |
| 2022/0258008 A1 | 8/2022 | Watterson et al. |
| 2022/0266085 A1 | 8/2022 | Dalebout et al. |
| 2022/0280857 A1 | 9/2022 | Watterson |
| 2022/0309042 A1 | 9/2022 | Archer |
| 2022/0314078 A1 | 10/2022 | Watterson et al. |
| 2022/0323827 A1 | 10/2022 | Watterson et al. |
| 2022/0339493 A1 | 10/2022 | Larsen |
| 2022/0339520 A1 | 10/2022 | Toth |
| 2022/0342969 A1 | 10/2022 | Watterson et al. |
| 2022/0347516 A1 | 11/2022 | Taylor |
| 2022/0347548 A1 | 11/2022 | Watterson |
| 2022/0362613 A1 | 11/2022 | Watterson et al. |
| 2022/0362624 A1 | 11/2022 | Dalebout |
| 2022/0395729 A1 | 12/2022 | Toth |
| 2023/0039903 A1 | 2/2023 | Brammer et al. |
| 2023/0054845 A1 | 2/2023 | Smith |
| 2023/0122235 A1 | 4/2023 | Ashby et al. |
| 2023/0128721 A1 | 4/2023 | Plummer |
| 2023/0158358 A1 | 5/2023 | Ercanbrack et al. |
| 2023/0181993 A1 | 6/2023 | Taylor et al. |
| 2023/0191189 A1 | 6/2023 | Taylor et al. |
| 2023/0191197 A1 | 6/2023 | Ashby |
| 2023/0218975 A1 | 7/2023 | Toles et al. |
| 2023/0226401 A1 | 7/2023 | Watterson |

OTHER PUBLICATIONS

U.S. Appl. No. 17/739,819, filed May 9, 2022, Buchanan.
U.S. Appl. No. 17/841,313, filed Jun. 15, 2022, Weston et al.
U.S. Appl. No. 17/963,822, filed Oct. 11, 2022, Powell.
U.S. Appl. No. 18/091,004, filed Dec. 29, 2022, Cox.
U.S. Appl. No. 18/103,221, filed Jan. 30, 2023, Dalebout et al.
U.S. Appl. No. 18/114,758, filed Feb. 27, 2023, Cutler et al.
U.S. Appl. No. 18/117,263, filed Mar. 3, 2023, Smith et al.
U.S. Appl. No. 18/123,026, filed Mar. 17, 2023, Silcock et al.
U.S. Appl. No. 18/132,277, filed Apr. 7, 2023, Vasquez et al.
U.S. Appl. No. 18/136,535, filed Apr. 19, 2023, Ashby et al.
U.S. Appl. No. 18/141,872, filed May 1, 2023, Ashby et al.
U.S. Appl. No. 18/205,299, filed Jun. 2, 2023, Wrobel.
U.S. Appl. No. 18/207,512, filed Jun. 8, 2023, Chuang.
U.S. Appl. No. 18/210,505, filed Jun. 15, 2023, Nielsen et al.
U.S. Appl. No. 29/702,127, filed Sep. 16, 2019, Cutler et al.
U.S. Appl. No. 62/273,852, filed Dec. 31, 2015, Watterson.
U.S. Appl. No. 63/073,081, filed Sep. 1, 2021, Ashby et al.
U.S. Appl. No. 63/079,697, filed Sep. 7, 2020, Willardson et al.
U.S. Appl. No. 63/086,793, filed Oct. 20, 2020, Ashby.
U.S. Appl. No. 63/134,036, filed Jan. 5, 2021, Ercanbrack et al.

(56) References Cited

OTHER PUBLICATIONS

U.S. Appl. No. 63/150,066, filed Feb. 16, 2021, Smith.
U.S. Appl. No. 63/156,801, filed Mar. 4, 2021, Watterson.
U.S. Appl. No. 63/165,498, filed Mar. 24, 2021, Archer.
U.S. Appl. No. 63/179,094, filed Apr. 23, 2021, Watterson et al.
U.S. Appl. No. 63/180,521, filed Apr. 27, 2021, Watterson et al.
U.S. Appl. No. 63/187,348, filed May 11, 2021, Dalebout et al.
U.S. Appl. No. 63/188,431, filed May 13, 2021, Plummer.
U.S. Appl. No. 63/200,903, filed Apr. 2, 2021, Watterson et al.
U.S. Appl. No. 63/211,870, filed Jun. 17, 2021, Watterson et al.
U.S. Appl. No. 63/216,313, filed Jun. 29, 2021, Watterson et al.
U.S. Appl. No. 63/229,794, filed Aug. 12, 2021, Brammer.
U.S. Appl. No. 63/235,002, filed Aug. 19, 2021, Smith.
U.S. Appl. No. 63/254,470, filed Oct. 11, 2021, Powell.
U.S. Appl. No. 63/278,714, filed Nov. 12, 2021, Taylor.
U.S. Appl. No. 63/289,997, filed Dec. 15, 2021, Taylor et al.
U.S. Appl. No. 63/290,455, filed Dec. 16, 2021, Taylor et al.
U.S. Appl. No. 63/290,557, filed Dec. 16, 2021, Ashby.
U.S. Appl. No. 63/298,170, filed Jan. 10, 2022, Ercanbrack et al.
U.S. Appl. No. 63/299,357, filed Jan. 13, 2022, Toles et al.
U.S. Appl. No. 63/305,976, filed Feb. 2, 2022, Watterson.
U.S. Appl. No. 63/329,270, filed Apr. 8, 2022, Vasquez et al.
U.S. Appl. No. 63/332,581, filed Apr. 25, 2022, Ashby et al..
U.S. Appl. No. 63/338,265, filed May 4, 2022, Ashby et al.
U.S. Appl. No. 63/350,072, filed Jun. 8, 2022, Chuang.
U.S. Appl. No. 63/352,539, filed Jun. 15, 2022, Nielsen et al.
U.S. Appl. No. 63/471,680, filed Jun. 7, 2023, Powell et al.
U.S. Appl. No. 63/316,890, filed Mar. 4, 2022, Smith et al.

* cited by examiner

```
600
 ├── 610  Obtain workout video
 ├── 620  Identify songs in workout video
 ├── 630  Identify tempo of songs
 ├── 640  Convert tempo to speed
 ├── 650  Generate control signals based on speed
 └── 660  Associate control signals with workout video
```

FIG. 6

TREADMILL KARAOKE

CROSS-REFERENCE TO RELATED PATENT APPLICATIONS

This application claims the benefit of and priority to U.S. Provisional Application No. 63/299,357, filed Jan. 13, 2022, which application is incorporated herein by reference in its entirety for all it discloses.

BACKGROUND

Physical exercise has many benefits, but it can be difficult for individuals to find motivation to engage in physical exercise. For example, many individuals may find physical exercise boring and/or repetitive. Accordingly, methods and systems for motivating individuals to engage in physical exercise may be beneficial.

SUMMARY

Aspects of one embodiment of the present disclosure are related to a method for controlling a treadmill using a video. The method may include receiving a workout video at a treadmill. The treadmill may include a display, an endless belt, one or more actuators configured to control a speed and/or incline of the endless belt, and one or more processors. The method may include displaying, by the one or more processors, the workout video on the display. The workout video may include audio of a song, text of lyrics of the song, and/or an indication of progress through the lyrics. The method may include controlling, by the one or more processors, actuators of the treadmill according to control signals associated with the workout video.

Aspects of one embodiment of the present disclosure are related to a system configured to control a treadmill using a video. The system may include a treadmill including an endless belt, one or more actuators, a display, and one or more processors. The one or more processors may be configured to receive a workout video, the workout video including a song, text of lyrics of the song, and/or an indication of progress through the lyrics of the song. The processors may be configured to receive control signals associated with the workout video, display the workout video, and/or control the one or more actuators according to the control signals associated with the workout video.

Aspects of one embodiment of the present disclosure are related to a method for automatically generating control signals based on songs in a workout video. The method may include obtaining a workout video including a song, identifying the song in the workout video, obtaining lyrics of the song, generating text of the lyrics of the song, and modifying the workout video to create a modified workout video by adding the text of the lyrics of the song to the workout video. The method may include identifying parameters of the song, automatically generating, by one or more processors, control signals based on the parameters of the song, associating the control signals with the workout video, and publishing the modified workout video and the associated control signals.

Aspects of one embodiment of the present disclosure are related to a method for generating workouts including exercise and singing. The method may include receiving a playlist from a first user, receiving workout parameters from the first user, generating a workout based on the workout parameters, and publishing the workout to the first user and a second user. The method may include receiving audio from the first user at first exercise equipment associated with the first user, receiving audio from the second user at second exercise equipment associated with the second user, playing the audio from the first user at the second exercise equipment, and playing the audio from the second user at the first exercise equipment.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 is a flow diagram depicting operations in a process for automatically generating control signals based on songs in a workout video.

DETAILED DESCRIPTION

The present disclosure allows for motivational content to be added to workout videos such as lyrics to songs in the workout. Indications of which lyrics are to be sung allow for sing-along or karaoke workout experiences. This creates a more engaging workout experience than conventional workout programs without sing-along or karaoke elements. Increased levels of engagement may result in increased levels of user enjoyment as well as increased levels of participation. Engagement may be further heightened by the use of control signals associated with workout videos having sing-along or karaoke elements. The control signals may be coordinated with or based on the songs in the workout video which may result in greater immersion in the workout or greater levels of excitement as compared to conventional workout programs without coordinated control signals and singing elements.

Figure 1A:
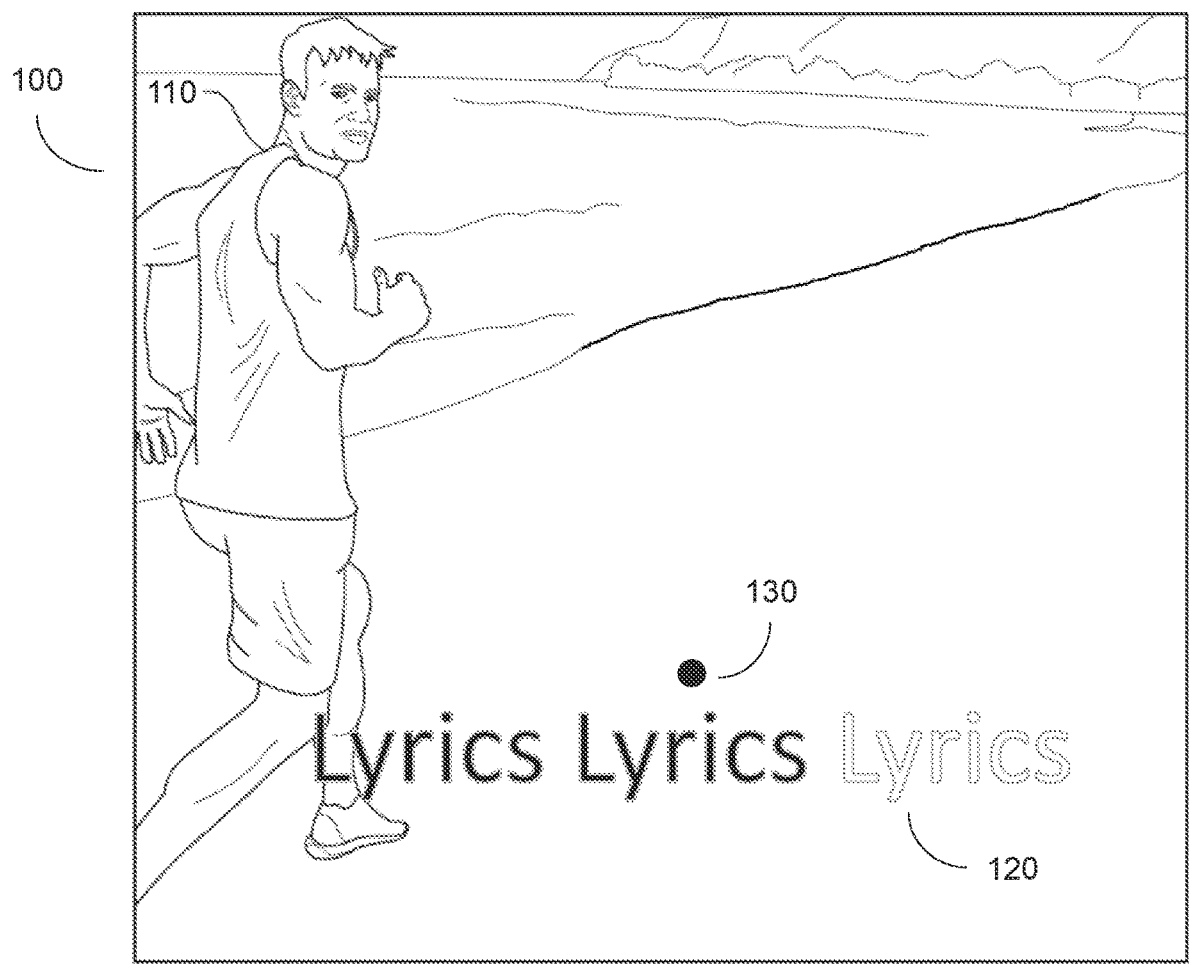
FIG. 1A illustrates an example view of a video in accordance with one or more embodiments.

FIG. 1A illustrates an example view 100 of a video, in accordance with one or more embodiments of the present disclosure. The example view 100 may represent a view of a workout video. The video may include a trainer 110. The trainer 110 may or may not be using workout equipment. The video may include text 120. The text 120 may be lyrics of songs in the video. The trainer 110 may or may not be singing along with the songs in the video. The text 120 may be shown in short portions. The short portions of the text 120 may appear in the video based on when the words of each portion are sung in the songs, synchronizing the audio of the songs and the text 120. In some embodiments the text 120 may change visually to indicate progress through the song. The visual changes of the text 120 may serve to indicate which word is being sung in the song. For example, words of the text 120 may change color as they are sung in the song, synchronizing the text 120 with the audio of the song. The video may include a marker 130. The marker 130 may move along the text 120 to indicate progress through the song. In some embodiments the marker 130 moves along the text 120 in conjunction with visual changes to the text 120. For example, the marker 130 may move along words of the text 120 as the words change color to show progress through the song and thus synchronize the text and marker with the audio of the song.

Figure 1B:
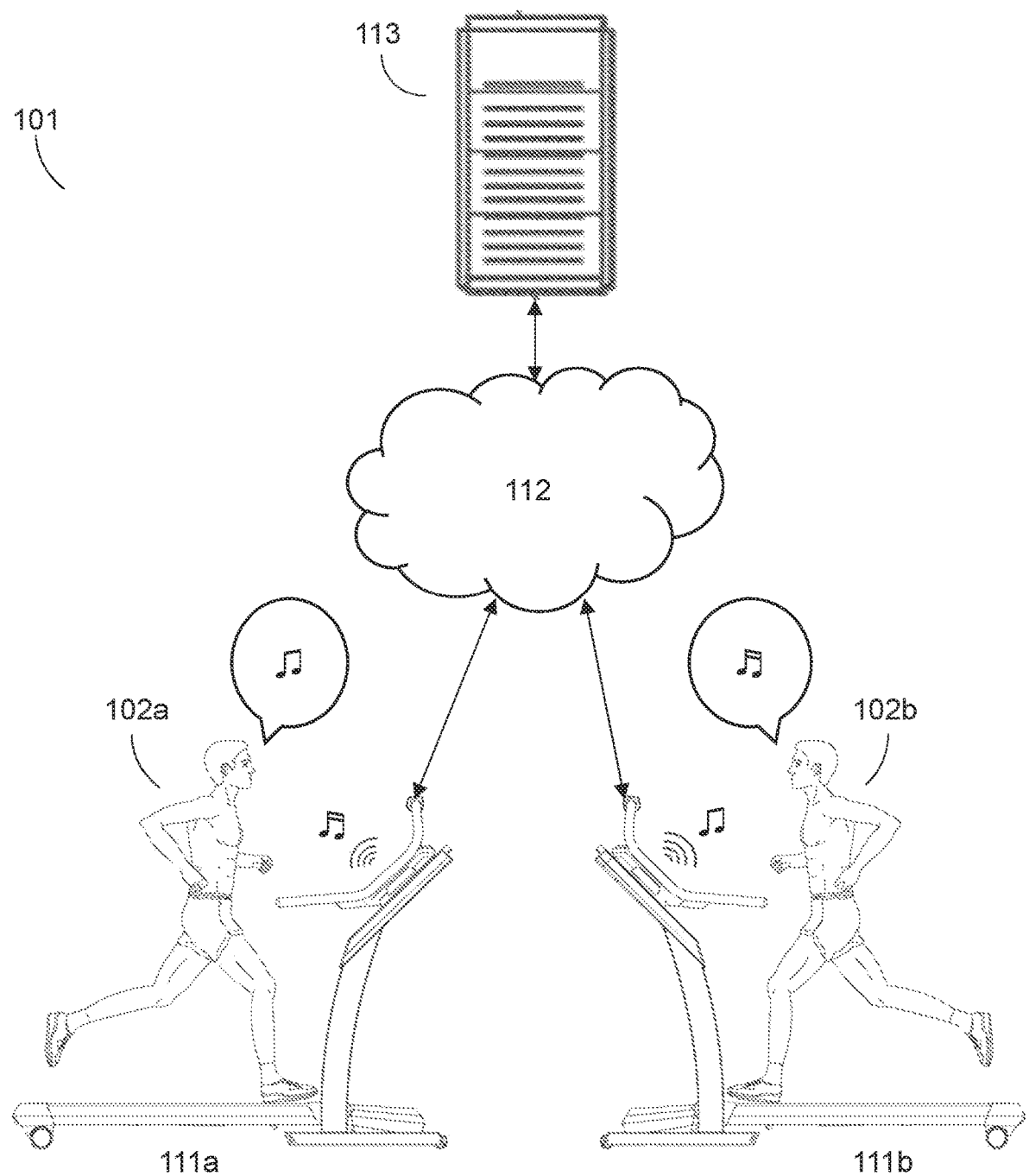
FIG. 1B illustrates an example implementation of one or more embodiments.

FIG. 1B illustrates an example implementation 101 of one or more embodiments of the present disclosure. A first user 102*a* and a second user 102*b* may exercise on a first treadmill 111*a* and a second treadmill 111*b*, respectively. The first treadmill 111*a* and the second treadmill 111*b* may communicate with a remote computing device 113 through a network 112. The network 112 may be any wide area network (WAN) or local area network (LAN). The network 112 may be the internet. The remote computing device 113 may be a server. The remote computing device 113 may store in a memory of the remote computing device 113 a workout video containing one or more songs. The remote computing device 113 may stream the workout video containing one or more songs to the first treadmill 111*a* and the second treadmill 111*b* through the network 112. In some embodiments the first treadmill 111*a* and the second treadmill 111*b* may download the workout video through the network 112. The workout video including one or more songs may include text of lyrics of the one or more songs. A view of the workout video may be similar to the example view 100 of FIG. 1A. The first user 102*a* may sing along with the workout video. The first treadmill 111*a* may capture, using a microphone of the first treadmill 111*a*, audio of the singing of the first user 102*a*. In some embodiments the first treadmill 111*a* may transmit the audio of the first user 102*a* to the remote computing device 113 through the network 112 which may transmit the audio of the first user 102*a* to the second treadmill 111*b* through the network 112. In other embodiments, the first treadmill 111*a* may transmit the audio of the first user 102*a* to the second treadmill 111*b* through the network 112. The second treadmill 111*b* may play the audio of the first user 102*a* using a speaker of the second treadmill 111*b*. The second user 102*b* may sing along with the workout video. The second treadmill 111*b* may capture, using a microphone of the second treadmill 111*b*, audio of the singing of the second user 102*b*. In some embodiments the second treadmill 111*b* may transmit the audio of the second user 102*b* to the remote computing device 113 through the network 112 which may transmit the audio of the second user 102*b* to the first treadmill 111*a* through the network 112. In other embodiments, the second treadmill 111*b* may transmit the audio of the second user 102*b* to the first treadmill 111*a* through the network 112. The first treadmill 111*a* may play the audio of the second user 102*b* using a speaker of the first treadmill 111*a*. In this way, the first user 102*a* and the second user 102*b* may have the experience of exercising and singing together, even when they are in separate, remote locations, and/or when they are exercising at different times.

Figure 2:
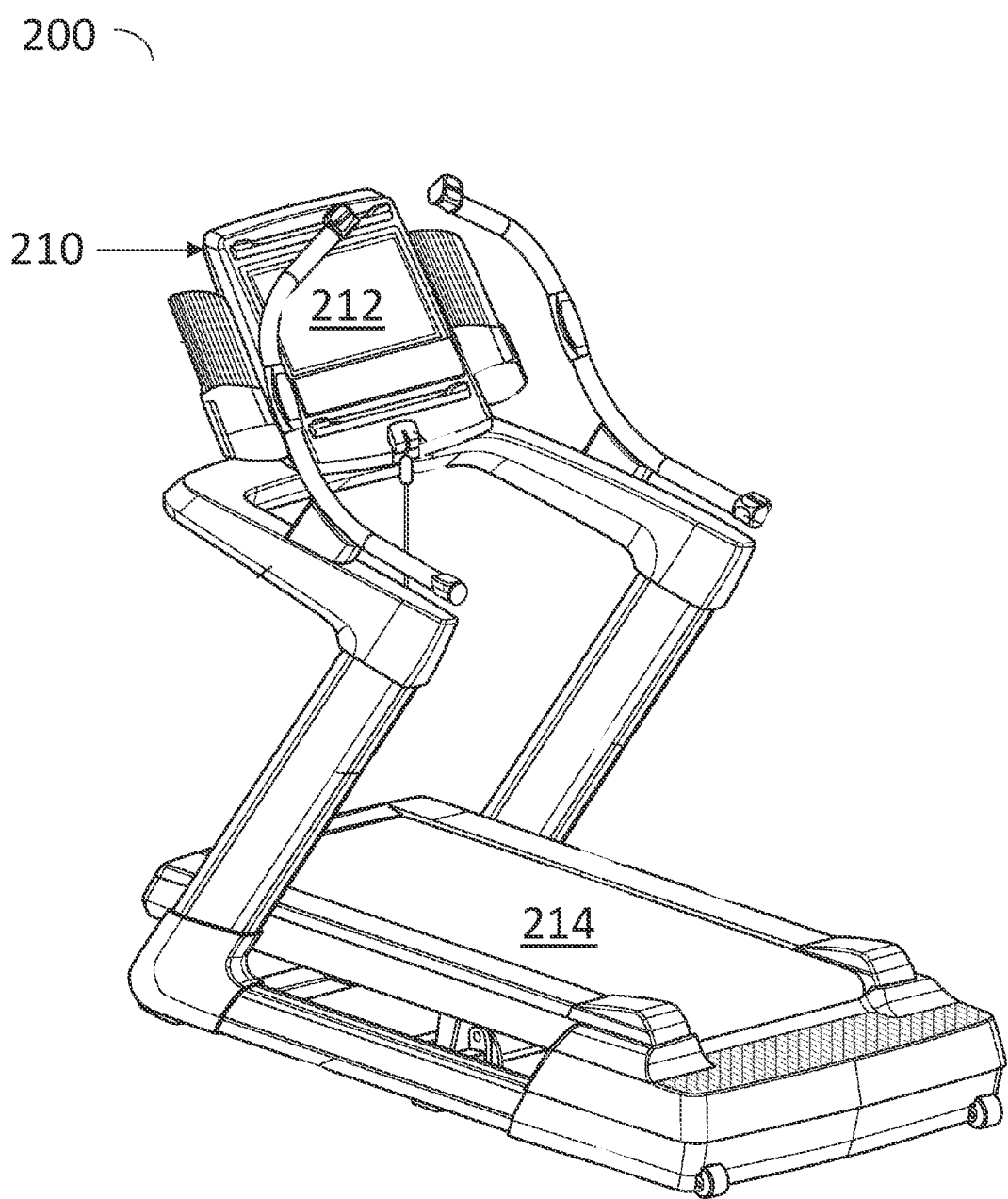
FIG. 2 illustrates an example treadmill in accordance with one or more embodiments.

FIG. 2 illustrates an example treadmill 200, according to one embodiment of the present disclosure. The treadmill 200 may include a console 210. The console may include a display 212. The display may include one or more speakers. The display may be a touchscreen. The display 212 may receive user input and/or display workout videos. For example, the display 212 may display the example view 100 of FIG. 1A. In some embodiments, the display 212 may display workout videos based on user input. The treadmill 200 may include an endless belt 214. The endless belt 214 may be controlled by one or more actuators. The one or more actuators may control a speed and/or incline of the endless belt 214. Embodiments are described herein with respect to treadmills, but one of ordinary skill in the art will understand that other types of exercise equipment may be used including, but not limited to, exercise bikes, stair steppers, ellipticals, rowing machines, resistance-based exercise equipment (e.g., cable based weight training equipment), stationary bicycles, or other exercise equipment. For example, the one or more actuators that may control the speed and/or incline of the endless belt 214 of the treadmill 200, may increase the resistance and/or incline of an elliptical, stair stepper, rowing machine, stationary bicycle, other exercise equipment, or combinations thereof. In another example, the one or more actuators may control the resistance provided by resistance-based exercise equipment (e.g., resistance-based weight training equipment).

Figure 3:
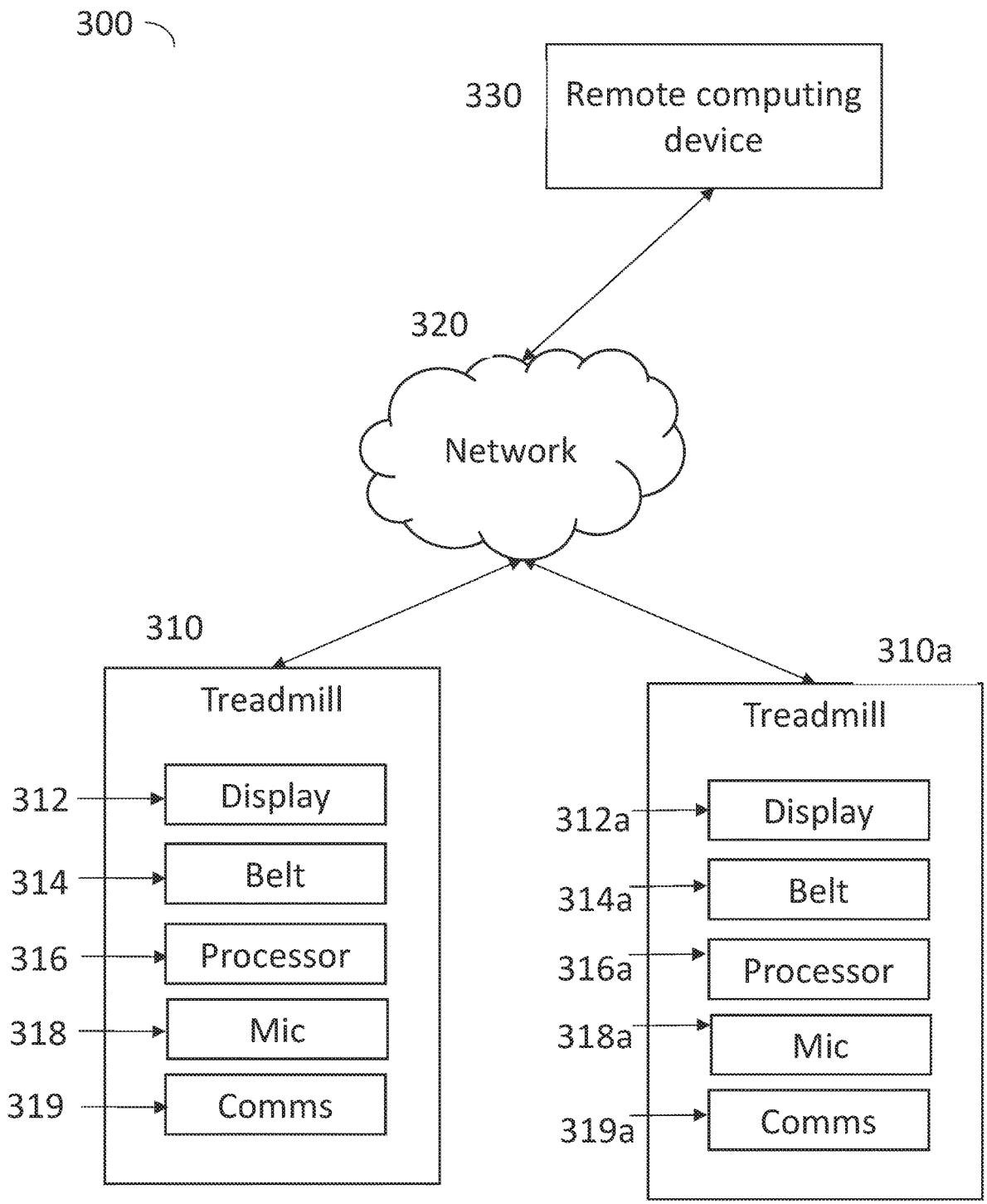
FIG. 3 illustrates an example environment in accordance with one or more embodiments.

FIG. 3 illustrates an example environment 300 in which one or more embodiments of the present disclosure may take place. Treadmills 310 and 310*a*, referred to interchangeably as treadmill 310 may communicate with each other through a network 320. In some embodiments a plurality of treadmills may communicate with each other through network 320. A treadmill 310 may include a display 312, a belt 314, a processor 316, a microphone 318, and a communications interface 319. The display 312, the belt 314, the processor 316, the microphone 318, and the communications interface 319 may be housed in a console of the treadmill 310 such as the console 210 of the treadmill 200 of FIG. 2. The treadmill 310 may communicate with a remote computing device 330 through the network 320. The treadmill 310 may communicate with the remote computing device 330 using the communications interface 319 of the treadmill 310. The treadmill 310 may receive workout videos, control signals associated with the workout videos, and other data from the remote computing device 330. The remote computing device 330 may receive user input received at the display 312 of the treadmill 310 from the treadmill 310.

Figure 4:
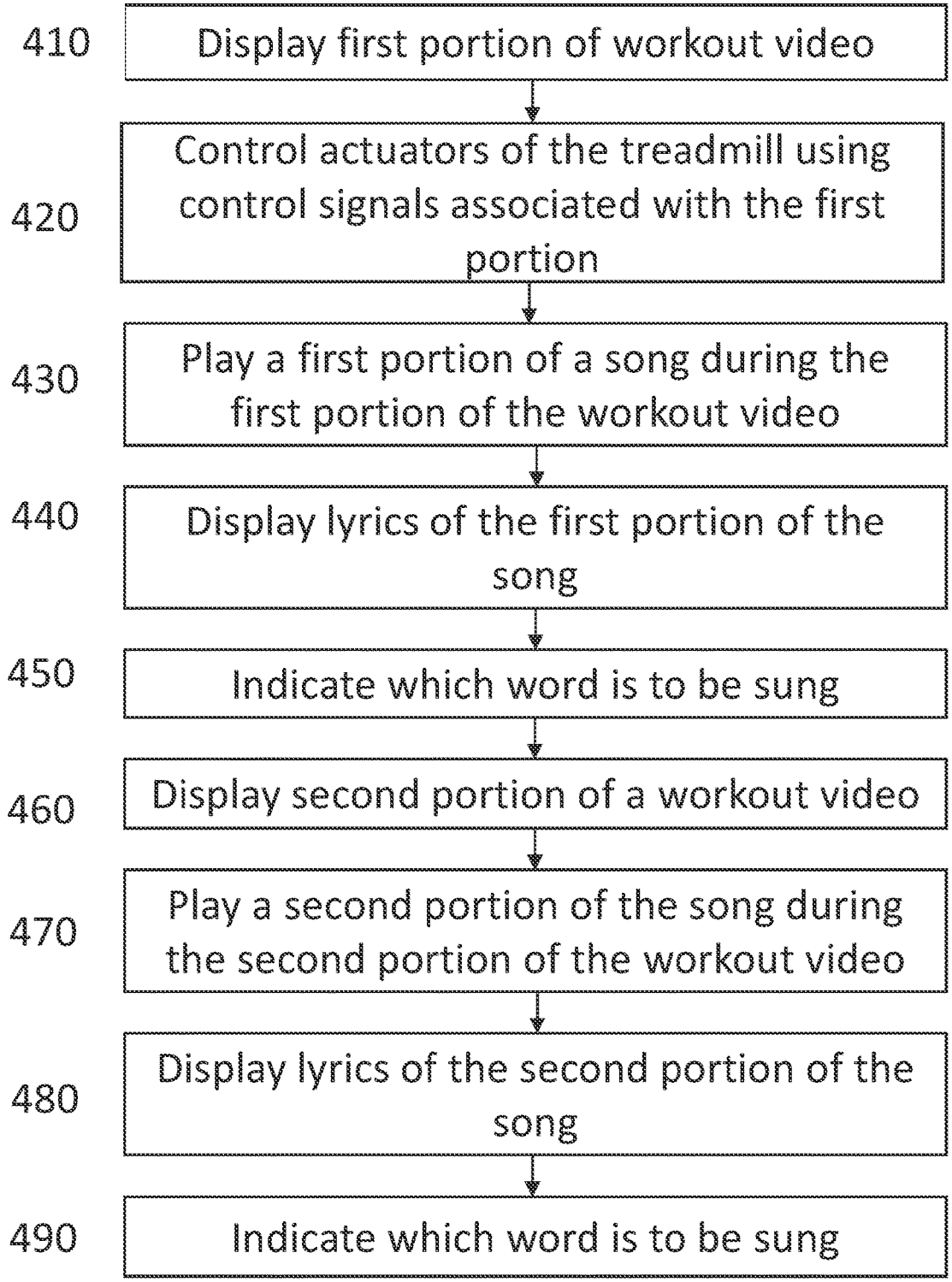
FIG. 4 is a flow diagram depicting operations in a process for controlling a treadmill using a workout video.

FIG. 4 is a flow diagram depicting operations in a process 400 for controlling a treadmill using a workout video, according to one embodiment of the present disclosure. Additional, fewer, or different operations may be performed in the method, depending on the embodiment. Further, the operations may be performed in the order shown, concurrently, or in a different order.

For example, the process 400 may be performed in the environment 300 of FIG. 3. At 410 a first portion of a workout video is displayed. For example, the treadmill 310 may receive, through the network 320, a workout video and associated control signals from the remote computing device 330. At 420 actuators of the treadmill are controlled using control signals associated with the first portion of the workout video. For example, the processor 316 of the treadmill 310 may cause actuators of the treadmill to control a belt of the treadmill according to control signals associated with the workout video. At 430 a first portion of a song is played during the first portion of the workout video. For example, the workout video may include a song with a first portion of the song being played during a first portion of the workout video. At 440 lyrics of the first portion of the song are displayed. For example, lyrics of a song may be present in the workout video such that they are displayed line by line on the display 312 of the treadmill 310. At 450, which word of the first portion of the song is to be sung is indicated. For example, words of the lyrics of the song may be highlighted in the workout video at the time they are to be sung by a user of the treadmill. In another example, a marker, such as the marker 130 of FIG. 1A, may be used to indicate which word is to be sung. At 460 the second portion of the workout video is displayed. At 470 the second portion of the song is played during the second portion of the workout video. At 480 the lyrics of the second portion of the song are displayed. At 490 which word of the first portion of the song is to be sung is indicated.

Figure 5:
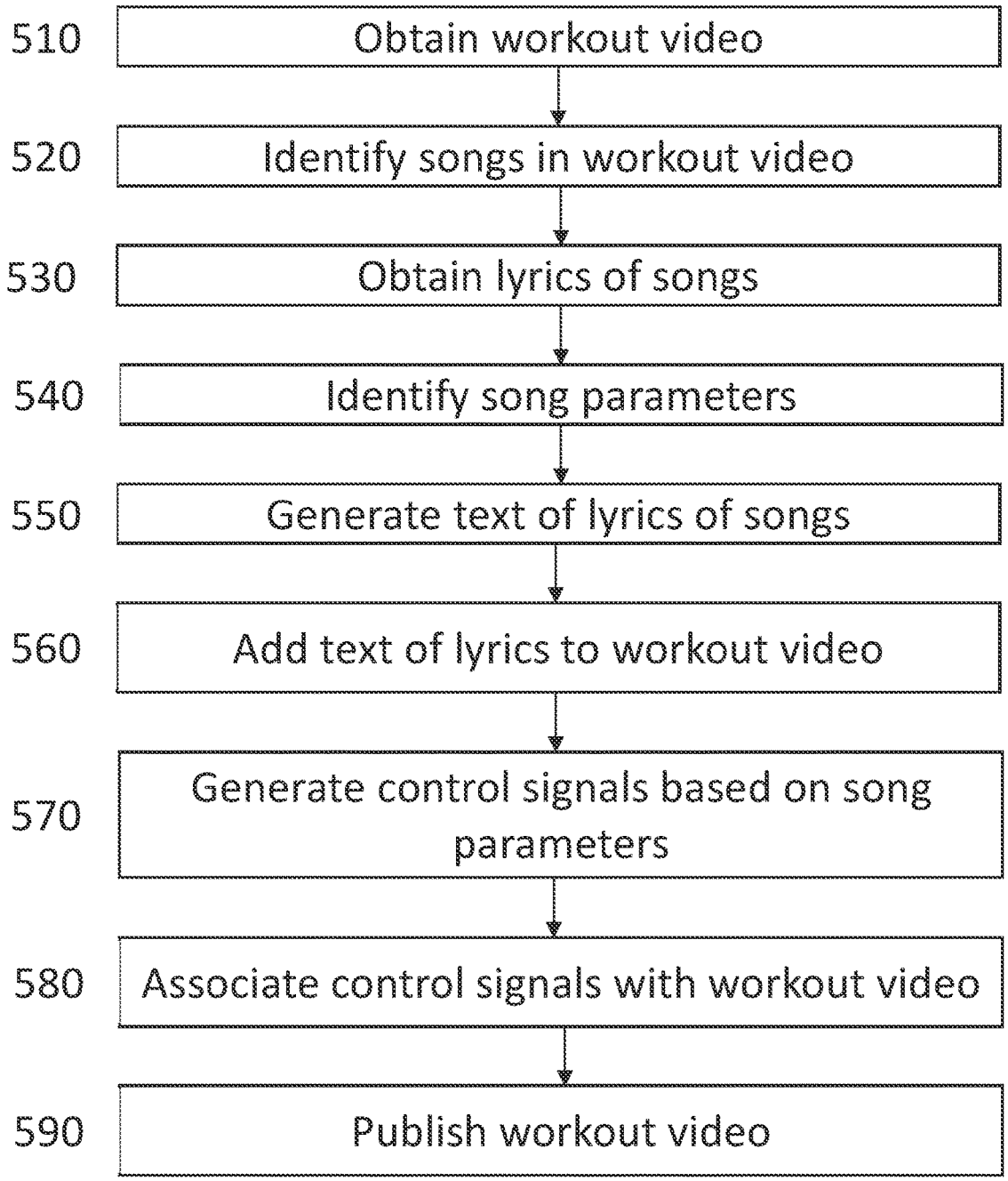
FIG. 5 is a flow diagram depicting operations in a process for adding functionality to a workout video.

FIG. 5 is a flow diagram depicting operations in a process 500 for adding functionality to a workout video, according to one embodiment of the present disclosure. Additional, fewer, or different operations may be performed in the method, depending on the embodiment. Further, the operations may be performed in the order shown, concurrently, or in a different order.

At 510 a workout video is obtained containing at least one song. At 520 the songs in the workout video are identified. At 530 lyrics of the songs are obtained. At 540 parameters of the songs are identified. At 550 text of the lyrics of the songs is generated. At 560 the text of the lyrics is added to the workout video (e.g., to create a modified workout video). At 570 control signals are generated based on song parameters. At 580 the control signals are associated with the workout video. At 590 the workout video is published.

FIG. 6 is a flow diagram depicting operations in a process 600 for automatically generating control signals based on songs in a workout video, according to one embodiment of the present disclosure. Additional, fewer, or different operations may be performed in the method, depending on the embodiment. Further, the operations may be performed in the order shown, concurrently, or in a different order.

At 610 a workout video is obtained containing at least one song. At 620 the songs of the workout video are identified. At 630 the tempos of the songs are identified. At 640 the tempos are converted to speeds. At 650 control signals are generated based on the speeds. At 660 the control signals are associated with the workout video.

Figure 7:
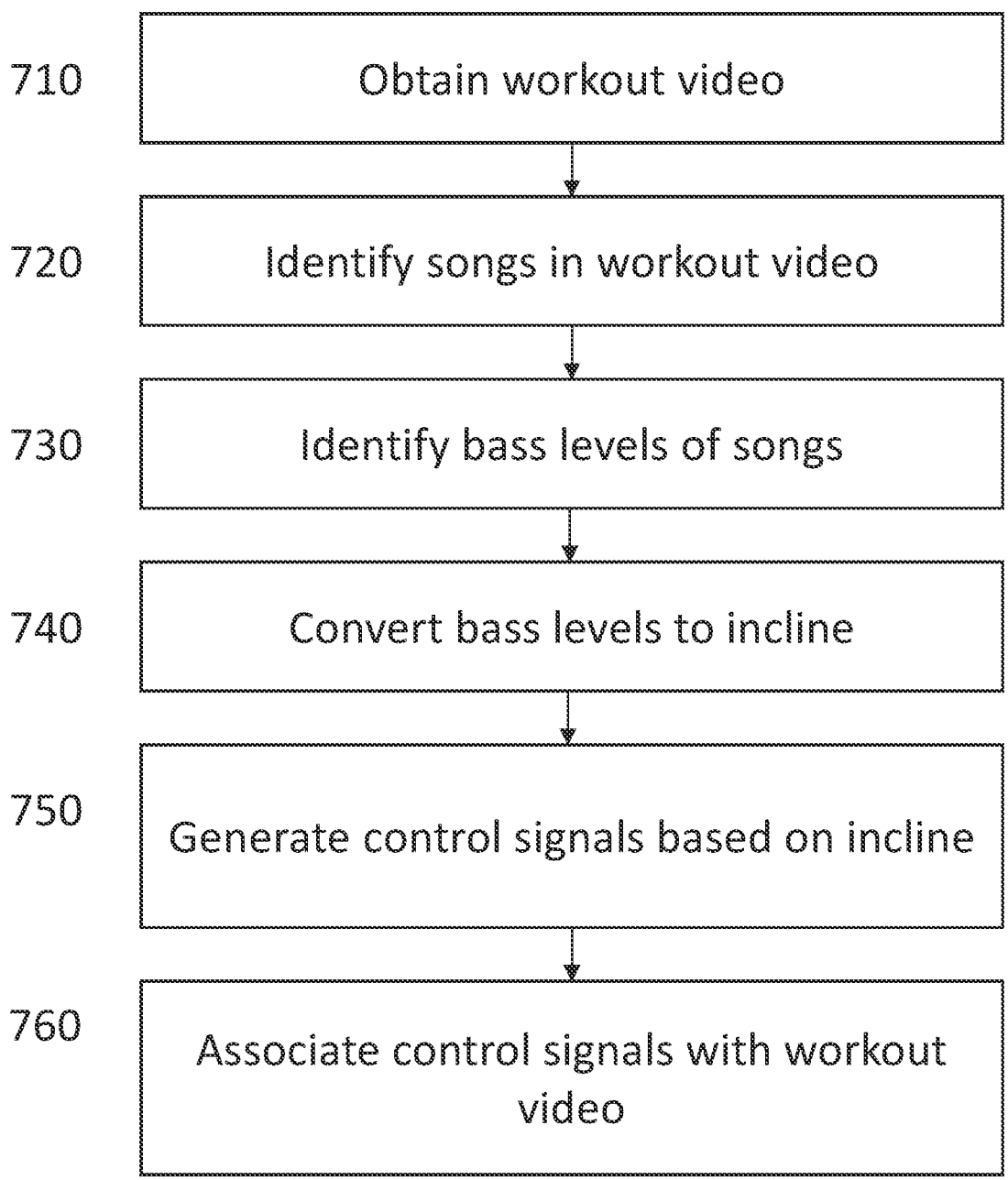
FIG. 7 is a flow diagram depicting operations in another process for automatically generating control signals based on songs in a workout video.

FIG. 7 is a flow diagram depicting operations in a process 700 for automatically generating control signals based on songs in a workout video, according to one embodiment of the present disclosure. Additional, fewer, or different operations may be performed in the method, depending on the embodiment. Further, the operations may be performed in the order shown, concurrently, or in a different order.

At 710 a workout video is obtained containing at least one song. At 720 the songs of the workout video are identified. At 730 the bass levels of the songs are identified. At 740 the bass levels are converted to inclines. At 750 control signals are generated based on the inclines. At 760 the control signals are associated with the workout video.

Figure 8:
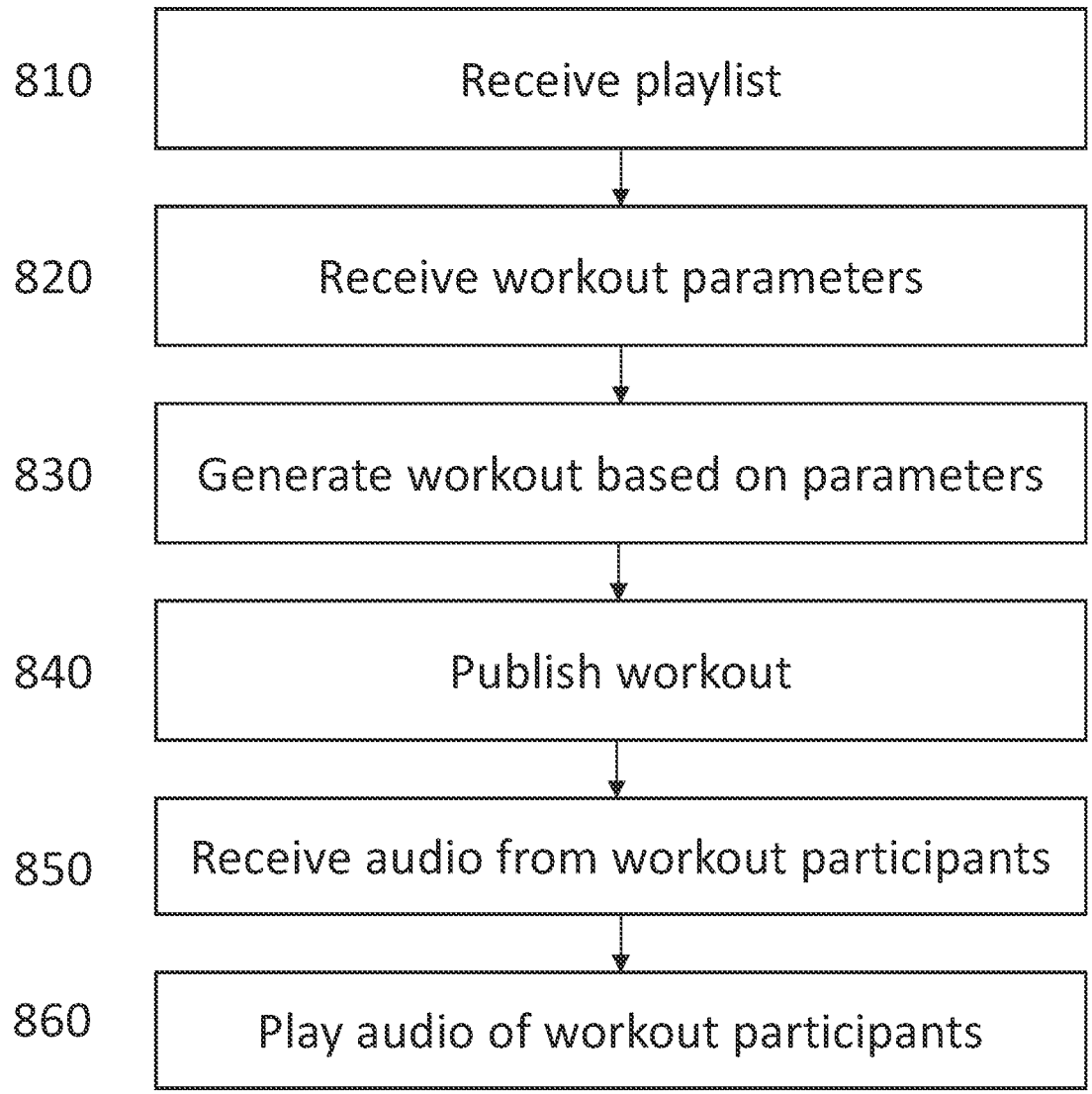
FIG. 8 is a flow diagram depicting operations in a process for creating a workout in accordance with one or more embodiments.

FIG. 8 is a flow diagram depicting operations in a process 800 for creating and scheduling a workout, according to one embodiment of the present disclosure. Additional, fewer, or different operations may be performed in the method, depending on the embodiment. Further, the operations may be performed in the order shown, concurrently, or in a different order.

At 810 a playlist including one or more songs is received. The playlist may be received at exercise equipment such as the treadmill 200 of FIG. 2. The playlist may be input by a user of the exercise equipment. In some embodiments the playlist may be entered by a user at a display of the exercise equipment. In other embodiments, the playlist may be received by the exercise equipment from a computing device through a network. For example, the playlist may be received by the exercise equipment from a smart device of the user. In another example, the playlist may be received by the exercise equipment from a remote server through a network. The remote server may be associated with a music application in which the user created the playlist. At 820 workout parameters may be received. Workout parameters may include a difficulty level, a workout style, a workout length, and a workout time and date. Difficulty levels may include various levels of intensity and fitness levels. Workout styles may include high intensity interval training (HIIT), bootcamp, relaxed, constant output, fat burning, other workout styles, and combinations thereof. In some embodiments workout parameters may include specific speeds, inclines, resistances, at specific times in the workout. At 830 a workout based on the workout parameters may be generated. The workout may include the playlist, including video of the lyrics of the song of the playlist. The generated workout may include control signals that cause the actuators of the exercise equipment to change parameters of the exercise equipment. In some embodiments the workout may be automatically generated based on the workout parameters. In other embodiments the workout may be generated by selecting an existing workout or a portion of an existing workout that corresponds to one or more of the workout parameters. In some embodiments the user may edit the generated workout by changing one or more workout parameters, changing the control signals, adding, deleting, or replacing a portion of the workout, and/or replacing one or more songs of the playlist.

At 840 the workout may be published. The published workout may be executed on exercise equipment such that the video of the lyrics of the songs of the playlist plays on a display of the exercise equipment and/or the actuators of the exercise equipment are controlled according to the control signals. In some embodiments the workout may be published to the user who input the playlist and workout parameters. In some embodiments, the workout may also be published to one or more additional users. For example, the user may send an invitation to the one or more additional users to join the workout at the date and time of the workout. The workout may be published to the public. In some embodiments, the workout may be published to the public after the date and time of the workout. The user may create an invitation to a publically published workout and send it to one or more additional users. The invitation may include a date and time for the workout. The user and the one or more additional users may join the workout at the date and time and take the workout together. The user and the one or more additional users may take the workout together with or without other users in the workout. For example, a publically published workout may be accessed by any user. However, an invitation sent by a first user to a second user allows the first user and the second user to take the workout together without any other users. The first user and the second user can access the workout at the date and time of the invitation, and if a third user accesses the workout at the date and time of the invitation, the first and second users will take the workout together while the third user takes the workout separately.

At 850, audio of users taking the workout together is received. The audio of each user is received at the exercise equipment of each user using the microphone of the exercise equipment. The audio may be delivered to a remote computing device such as the remote computing device 330 of FIG. 3. The remote computing device may deliver the audio to the exercise equipment of the users taking the workout together. In some embodiments the control signals may be modified based on the audio of a user. For example, a user may be taking a workout and singing along with a song of the playlist as the lyrics are displayed on a display of exercise equipment. A microphone of the exercise equipment may receive the audio of the user singing and measure a volume of the audio. The exercise equipment may modify the control signals to make the workout easier if the volume of the audio of the user is below a threshold. At 860 the audio of the users taking the workout together is played at the workout equipment of the users taking the workout together. The audio may be played at the workout equipment such that each user hears the audio from all the other users in the workout. For example, a first user and a second user may be taking a workout together in two locations remote from each other. The first and second users may be singing along with a song of the playlist as the lyrics are displayed on a display of exercise equipment of the first user and a display of exercise equipment of the second user. The first user may hear the audio of the second user singing and the second user may hear the audio of the first user singing. In this example, the first user and the second user may feel like they are doing the workout together even though they are in two locations remote from each other. In some embodiments the audio levels may be adjusted to equalize the volume of the other users in the workout or to highlight one user of the other users.

Figure 9:
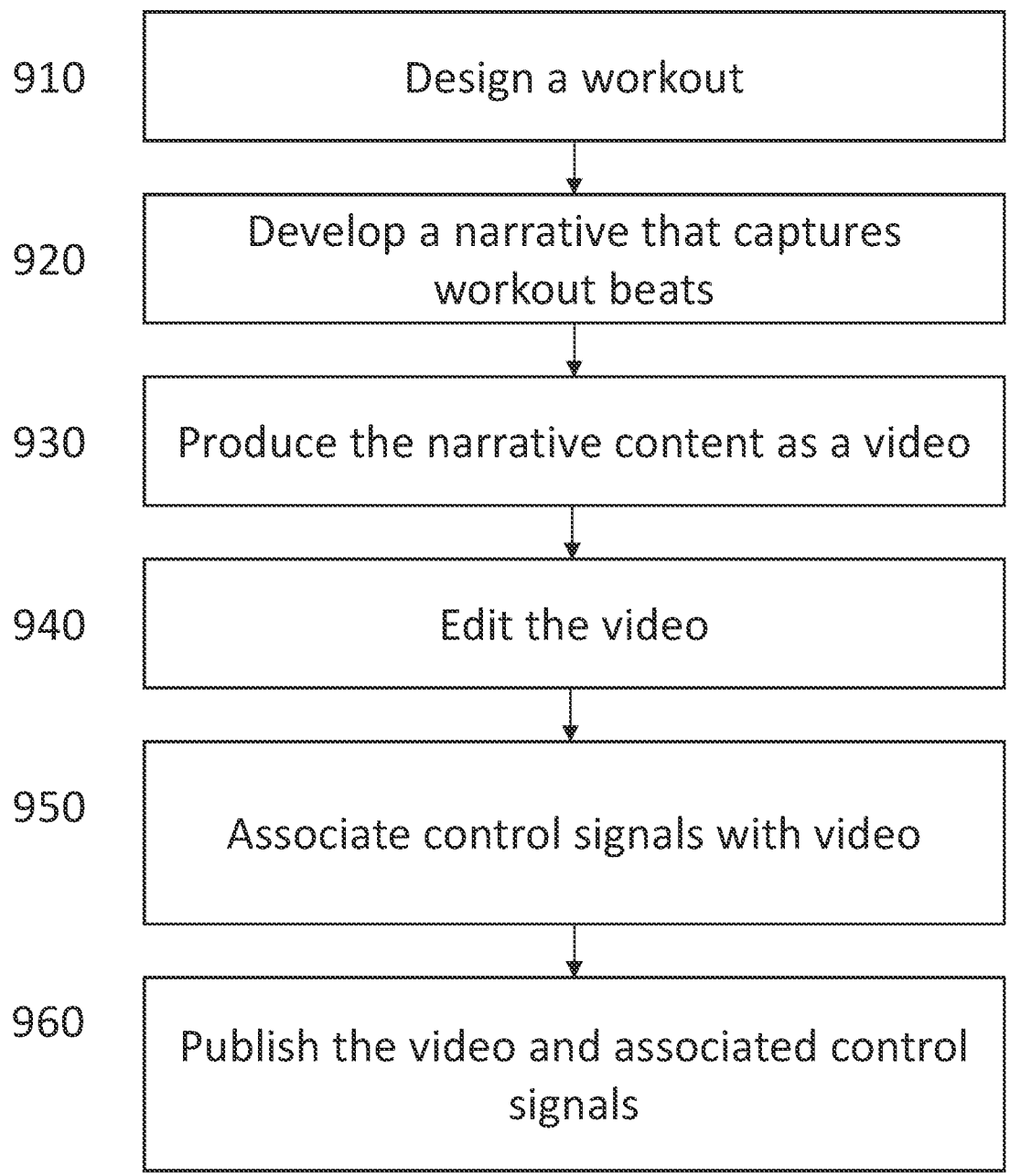
FIG. 9 is a flow diagram depicting operations in a process for creating a narrative workout in accordance with one or more embodiments.

FIG. 9 is a flow diagram depicting operations in a process 900 for creating a narrative workout, according to one or more embodiments of the present disclosure. Additional, fewer, or different operations may be performed in the method, depending on the embodiment. Further, the operations may be performed in the order shown, concurrently, or in a different order.

At 910, a workout is designed. Designing the workout may be based on parameters including a target intensity of the workout, a target mood of the workout, a target experience for the workout, and/or a target calorie burn. Control signals for the workout are determined which may control parameters of exercise equipment during the workout. In some embodiments, the workout may include songs which play during the workout. At 920 a narrative is developed which includes the workout. The narrative may be a story or narrative with events that include the workout, relate to the workout, or relate to the songs of the workout. The narrative may break the workout into portions with other elements such as dialogue, action, or graphics between portions of the workout. At 930 the narrative is produced as a video. Producing the narrative as a video includes filming the narrative. In some embodiments the narrative may be filmed with trainers performing the workout. In other embodiments the narrative may be filmed separately from the workout. The narrative may be animated instead of filmed. The video may be a combination of filmed narrative and animated narrative. At 940 the video is edited or modified, for example, to create a modified workout video. Editing or modifying the video may include combining the narrative with the workout. Editing the video may include adding text of lyrics of the songs of the workout to the video. Editing the video may include adding a marker to the text of the lyrics of the songs of the workout to show progress through the lyrics. In this way, a modified workout video may be created. At 950 the control signals of the workout are associated with the video. Associating the control signals of the workout with the video may include associating the control signals with timestamps of the video when the control signals are to be executed. At 960 the video and associated control signals are published. Publishing the video and associated control signals may include delivering the video and associated control signals to exercise equipment of one or more users. Publishing the video and associated control signals may include displaying the video on a display of exercise equipment and controlling actuators of the exercise equipment using the associated control signals.

INDUSTRIAL APPLICABILITY

The embodiments discussed herein allow a user to engage in exercise that is both beneficial and enjoyable. A user can enjoy a more engaging workout than conventional workouts lacking music and elements to facilitate singing along with the music. The user can perform a workout that blends physical exercise with an interactive singing experience like karaoke. Workout equipment of the user can display a workout video with lyrics overlaying the video which guide the user in singing along. The user can also experience these workouts with other users. The user can input workout parameters to generate a workout and invite other users to join the workout. During the workout, users can hear each other singing along to the music, giving the impression that they are working out together, even when they are in different locations and/or are performing workouts at different times.

A workout video may include a trainer, audio of one or more songs, and text of lyrics of the one or more songs. In some embodiments the trainer may perform the workout and sing along with the one or more songs. In other embodiments, the trainer may perform the workout without singing along with the one or more songs. In yet other embodiments, the trainer may sing along with the one or more songs without performing the workout. The trainer may perform different actions during different portions of the workout video. In some embodiments the audio of the one or more songs may include lyrics. In other embodiments the audio of the one or more songs may not include lyrics. The text of the lyrics of the one or more songs may be broken into portions. The portions of text may have a length such that they can be displayed on a display of exercise equipment and be legible by a user using the exercise equipment. The text may be broken into portions and displayed on the display similar to how text is displayed on karaoke machines. In some embodiments the text may undergo a visual change to indicate progress through the lyrics. For example, words of the text may change color as they are sung, indicating to a user which words are being sung or which words are to be sung at a particular moment in the song. In some embodiments the video may include a marker which indicates progress through the lyrics such as used in some karaoke and singalong applications. The marker may indicate, for example by its position, which words are being sung or which words are to be sung at a particular moment in the song. For example, the marker may be a bouncing ball which bounces along the text of the lyrics.

Audio of users taking a workout together may be played at exercise machines of the users such that the users have the experience of exercising and singing together even when they are in separate, remote locations. A first user may exercise and sing on a first treadmill and a second user may exercise and sing on a second treadmill in a location remote from the first user. The first and second treadmills may each include a display, a microphone, and one or more speakers. The first and second treadmills may communicate with each other and/or with a remote computing device through a network. The network may be the internet. The first treadmill may capture audio of the first user using the microphone of the first treadmill. The second treadmill may capture audio of the second user using the microphone of the second treadmill. In some embodiments the first treadmill may transmit the audio of the first user to remote computing device which may transmit the audio of the first user to the second treadmill through the network. In other embodiments the first treadmill may transmit the audio of the first user to the second treadmill through the network. In some embodiments the second treadmill may transmit the audio of the second user to remote computing device which may transmit the audio of the second user to the first treadmill through the network. In other embodiments the second treadmill may transmit the audio of the second user to the first treadmill through the network. The first user may hear the audio of the second user and the second user may hear the audio of the first user. In this way, the first user and the second user may have the experience of exercising and singing together although they are in separate, remote locations. This provides a more engaging workout experience as compared to conventional workout experiences without the experience of exercising and singing together. Multiple users may take the same workout together at the same time and hear each other as they exercise and sing. Users may create private workouts which other users may join if they have an invitation or are on a list of allowed users. Users may also create public workouts which all users may join. Users may join workouts provided by a third party.

Embodiments of the present disclosure may be implemented using a variety of exercise equipment. The exercise equipment may include a display, one or more moving or movable members, a processor, a microphone, and a communications interface. For example, a treadmill may include a display, a moving endless belt, a processor, and a communications interface for communicating via a wireless network. In another example, an exercise bike may include a display, a pedal assembly configured to be moveable by a user, a processor, a microphone, and a communications interface for communicating via a wireless network. In some embodiments workout videos in accordance with the present disclosure may be used with a variety of workout equipment. For example, the same video may be used on a treadmill and on an exercise bike. In other embodiments, workout videos in accordance with one or more embodiments may be modified for use with a variety of exercise equipment. For example, a workout video for use with a treadmill may be modified for use with an exercise bike by changing control signals for controlling the exercise equipment. Control signals for controlling the incline of the treadmill may be converted into control signals for controlling the resistance of the exercise bike. Control signals for controlling the speed of the belt of the treadmill may be converted into target pedaling speeds for the exercise bike.

Exercise equipment may communicate with a remote computing device through a network. The network may be any local area network (LAN) or wide area network (WAN). In some embodiments the network may be the internet. The remote computing device may store in a memory of the remote computing device, workout videos in accordance with one or more embodiments. In some embodiments the remote computing device may be a server. The remote computing device may transmit, in response to a request from the exercise equipment, one or more workout videos to the exercise equipment. The exercise equipment may transmit a status of the exercise equipment to the remote computing device. The exercise equipment may transmit a time of the workout video to the remote computing device. For example, the exercise equipment may transmit a timestamp of playback of the video to the remote computing device. In some embodiments the exercise equipment may transmit audio of a user of the exercise equipment to the remote computing device. The audio of the user may be used to adjust control signals of the workout video. In other embodiments the exercise equipment may adjust the control signals of the workout video based on the audio of the user without transmitting the audio to the remote computing device.

In some embodiments the exercise equipment may communicate with other exercise equipment through the network. In some embodiments first exercise equipment may communicate with second exercise equipment through the network. In other embodiments the first and second exercise equipment may communicate with the remote computing device. For example, if two users are taking a workout together, the first and second exercise equipment may transmit a timestamp of the workout video to the remote computing device which may transmit a corrected timestamp of the workout video to the first and second exercise equipment. The corrected timestamp may serve to synchronize playback of the workout video on the first and second exercise equipment. In some embodiments the first exercise equipment may transmit audio of a first user and the second exercise equipment may transmit audio of a second user to the remote computing device. The audio of the first and second users may be used to adjust control signals of the workout video. In other embodiments the first exercise equipment may adjust the control signals of the workout video based on the audio of the first user and the second exercise equipment may adjust the control signals of the workout video based on the audio of the second user without transmitting the audio to the remote computing device. In some embodiments the audio of the first user may be transmitted to the second exercise equipment and the audio of the second user may be transmitted to the first exercise equipment. Hearing the other user may create the illusion that the first and second users are taking the workout together in the same space even if the first and second users are in different locations. The audio of the first and second users may be transmitted directly between the first and second exercise equipment or via the remote computing device.

In some embodiments different portions of a workout video may include different lyrics and be associated with different control signals. A first portion of a workout video may include text of first lyrics and may be associated with first control signals. During the first portion of the workout video the text of the first lyrics may be displayed on a display of exercise equipment and actuators of the exercise equipment may be controlled by the first control signals. A second portion of the workout video may include text of second lyrics and may be associated with second control signals. During the second portion of the workout video the text of the second lyrics may be displayed on the display of exercise equipment and the actuators of the exercise equipment may be controlled by the second control signals. A first portion of a song associated with the first lyrics may be played during the first portion of the workout video and a second portion of a song associated with the second lyrics may be played during the second portion of the workout video. During the first and second portions of the workout video, progress through the first and second lyrics may be indicated as discussed herein. As an example, a first portion of a workout video may include the lyrics "la la la" and be associated with control signals which cause a belt of a treadmill to operate at 3 mph while a second portion of the workout video may include the lyrics "yeah yeah yeah" and be associated with control signals which cause the belt of the treadmill to operate at 2 mph. During the first portion of the workout video, a console of the treadmill displays the lyrics "la la la," plays the portion of a song associated with the lyrics "la la la," and the belt of the treadmill runs at 3 mph while during the second portion of the workout video, the console of the treadmill displays the lyrics "yeah yeah yeah," plays the portion of the song associated with the lyrics "yeah yeah yeah," and the belt of the treadmill runs at 2 mph.

Control signals may be generated based on parameters of songs. For example, a workout video including one or more songs may be obtained, and the one or more songs of the workout video may be identified, for example, automatically. The one or more songs may be identified using metadata of the workout video. Lyrics of the one or more songs of the workout video may be obtained. The lyrics of the one or more songs may be obtained from the metadata of the workout video or from another source. Text of the lyrics may be generated or otherwise obtained. In some embodiments generating the text of the lyrics includes generating portions of the text of the lyrics which may be legibly displayed on a display of exercise equipment. In other embodiments the text of the lyrics may be obtained from a karaoke file of the song. The text of the lyrics may be added to the workout video. The text of the lyrics may be added to the workout video such that the text of the lyrics is synchronized with the one or more songs. In some embodiments the text of the lyrics may be added to the workout video as a layer of the video or as an overlay. In other embodiments, the text of the lyrics may be integrated into the workout video such that the workout video is modified to have the text of the lyrics. In yet other embodiments, the text of the lyrics may be added to the workout video in a manner similar to how text is added to video in karaoke files. Control signals may be generated based on song parameters. Control signals may be automatically generated based on song parameters such as tempo, bass levels, volume, genre, and pitch. The control signals may be associated with the workout video. In some embodiments, associating the control signals with the workout video may include embedding the control signals in a file of the workout video. In other embodiments, associating the control signals with the workout video may include generating a file containing the control signals and time stamps describing when the control signals are to be executed during playback of the workout video. The workout video may be published. Publishing the workout video may include publishing the associated control signals. Publishing the workout video may include adding the workout video to a library of workout videos. Publishing the workout video may include displaying the workout video on a display of exercise equipment and controlling actuators of the exercise equipment using the associated control signals.

In some embodiments control signals may be automatically generated for a workout video based on tempos of songs in the workout video. A workout video may be obtained including one or more songs. The one or more songs in the workout video may be identified. In some embodiments the one or more songs may be identified automatically using a song-recognizing algorithm. Tempos of the one or more songs may be identified. In some embodiments the tempos of the one or more songs may be automatically identified by an algorithm configured to identify beats and measure the time between beats. The tempos may be converted to speeds. In some embodiments the tempos may be converted to speeds automatically using an algorithm. For example, an algorithm configured to converted tempos to speeds could take a tempo measured in beats per minute, equate the beats per minute to steps, footfalls, or strides per minute, multiply the steps per minute by the average distance per step to get distance per minute and then convert to miles per hour. The algorithm may multiply the average distance per step by a scaling factor to account for different step lengths at different speeds. The algorithm may multiply the resulting speed by a second scaling factor to account for user comfort and/or psychological perceptions of tempo and/or speed. Control signals may be generated based on the speeds. The control signals may be associated with the workout video. In some embodiments, associating the control signals with the workout video may include embedding the control signals in a file of the workout video. In other embodiments, associating the control signals with the workout video may include generating a file containing the control signals and time stamps describing when the control signals are to be executed during playback of the workout video.

In some embodiments control signals may be automatically generated for a workout video based on bass levels of songs in the workout video. A workout video may be obtained including one or more songs. The one or more songs in the workout video may be identified. In some embodiments the one or more songs may be identified automatically using a song-recognizing algorithm. Bass levels of the one or more songs may be identified. In some embodiments the bass levels of the one or more songs may be automatically identified by an algorithm configured to identify the relative volume of different frequencies and determine the relative volume of bass frequencies to higher frequencies. The bass levels may be converted to inclines. In some embodiments the bass levels may be automatically converted to speeds using an algorithm. For example, an algorithm configured to convert bass levels to inclines could take a bass level measured in relative volume of bass frequencies to higher frequencies and convert it to relative incline compared to a base incline. In some embodiments the base incline may be zero. The algorithm may multiply the resulting incline by a scaling factor to account for user comfort and/or psychological perceptions of bass levels and/or incline. The control signals may be associated with the workout video. In some embodiments, associating the control signals with the workout video may include embedding the control signals in a file of the workout video. In other embodiments, associating the control signals with the workout video may include generating a file containing the control signals and time stamps describing when the control signals are to be executed during playback of the workout video.

Users may create workouts for themselves and other users. A first user may create a playlist containing one or more songs. The first user may send the playlist to a computing device. The computing device may be a server. The first user may select one or more workout parameters. The workout parameters may include a difficulty level, a workout style, a workout length, and a workout time and date. Difficulty levels may include various levels of intensity and fitness levels. Workout styles may include high intensity interval training (HIIT), bootcamp, relaxed, constant output, fat burning, any other workout style, and combinations thereof. In some embodiments workout parameters may include specific speeds, inclines, and/or resistances at specific times in the workout. The first user may define the workout parameters with as much or as little detail as desired. For example, the first user may define the workout parameters of a treadmill workout such that every aspect of the workout is defined. The first user may define the speed of a belt of a treadmill at every moment of the workout, and/or the incline of the belt of the treadmill at every moment of the workout. In another example, the first user may define only a style of the workout parameter, such as a HIIT workout. The user may send the workout parameters to the computing device. The computing device may generate a workout based on the workout parameters. Generating the workout based on the workout parameters may include incorporating as many of the workout parameters as possible in the workout. In some embodiments, generating the workout based on the workout parameters may include combining portions of existing workout videos corresponding to the workout parameters to create a new workout video. In other embodiments, generating the workout based on the workout parameters may include identifying a workout of a plurality of workouts which most closely matches the workout parameters. In yet other embodiments, generating the workout based on the workout parameters may include creating new portions of a workout video or a new workout video. Generating the workout based on the workout parameters may include generating control signals for controlling actuators of exercise equipment. Generating the workout based on the workout parameters may include defining a date and time of the workout. In some embodiments, the workout may be published. Publishing the workout may include adding the workout to a library of workouts. Publishing the workout may include receiving a list of invitees from the first user and sending an invitation to each invitee. Publishing the workout may include displaying the workout on displays of treadmills, controlling actuators of the treadmills according to the control signals of the workout, receiving audio from users taking the workout, and playing audio of the users taking the workout at the treadmills.

In some embodiments the workout may be available to a limited number of users. The first user may create a list of invitees or friends who may take the workout. The list of invitees or friends may be users, where each user has a treadmill. Each invited user may join the workout at the date and time associated with an invitation. The first user and the invited users may take the workout together. The first user may sing along with the one or more songs of the workout. A first treadmill of the first user may capture, using a microphone of the first treadmill, audio of the first user singing along with the one or more songs of the workout. The first treadmill may send the audio of the first user to the computing device. The computing device may send the audio of the first user to the treadmills of the invited users. The treadmills of the invited users may play the audio of the first user using speakers of the treadmills of the invited users such that the invited users can hear the first user. The invited users may sing along with the one or more songs of the workout. The treadmills of the invited users may capture audio of the invited users using microphones of the treadmills of the invited users. The treadmills of the invited users may send the audio of the invited users to the computing device which may send the audio of the invited users to the treadmills of the invited users and the first treadmill. The first treadmill and the treadmills of the invited users may play the audio of the invited users using speakers of each treadmill such that the first user hears the audio of the invited users and each invited user hears the audio of every other invited user. The treadmill of each invited user may not play the audio of the invited user associated with that treadmill. This way, each user in the workout may hear every other user in the workout, creating the experience of working out together. The audio of different users can be managed in different ways. For example, the audio of the first user or a selected invited user may be given priority such that it is louder than the audio of the other users or such that it is the only user audio that the users in the workout hear. In some embodiments songs may include different parts for users to sing. Each user may choose which part they wish to sing and the audio of the users may be adjusted to normalize the volume of each part. For example, if a song contains a melody part and a bass part and 10 users choose the melody part and 5 users choose the bass part, the volume of the audio of the 5 bass part users may be increased such that the bass part has an appropriate volume relative to the melody part.

In some embodiments the workout may be available to all users. The first user may choose to publish the workout to all users. The first user may choose to publish the workout to all users after having completed the workout alone, after having completed the workout with invited users, or before having completed the workout with invited users. The first user may issue an open invitation to all users or otherwise make the workout open to all users. The first user may add the workout to a library of workouts. Users may take the workout at any time with other users taking the workout at the same time and hear the other users. Users may take the workout and hear recordings of audio of other users who took the workout at different times. Times may be set for users to take workouts together so the users can have the experience of taking the workout live with other users. Users may suggest and vote on times for users to take the workout together.

Workouts may incorporate exercise, singing, and/or a narrative. A workout may be designed such that it meets one or more health, fitness, or wellness criteria. Designing the workout may be based on parameters including a target intensity of the workout, a target mood of the workout, a target experience for the workout, and a target calorie burn. The workout may include one or more exercises. The workout may include one or more control signals for exercise equipment. The workout may include one or more songs. The workout may be an existing workout which has been modified to include a narrative. The workout may be an existing workout which has been modified based on a narrative. A narrative may be developed that includes and incorporates the workout. The narrative may be a story or narrative with events that include the workout, relate to the workout, or relate to the songs of the workout. The narrative may break the workout into portions with other elements such as dialogue, action, or graphics between portions of the workout. The narrative may be produced as a video. Producing the narrative as a video may include filming a video of trainers and/or actors performing the narrative including the workout. In some embodiments the workout may be performed separate from the narrative. In some embodiments narrative elements may incorporate workout elements. In some embodiments workout elements may be based on narrative elements. The narrative may be animated instead of filmed. The video may be a combination of a filmed narrative and an animated narrative. Filming the narrative may include altering aspects of the workout and/or narrative. The video may be edited or modified, for example, to create a modified workout video. Editing or modifying the video may include combining the narrative with the workout. Editing the video may include adding text of lyrics of the songs of the workout to the video. Editing the video may include adding a marker to the text of the lyrics corresponding to the songs of the workout in order to show progress through the lyrics. In this way a modified workout video may be created. Control signals may be associated with the video. Associating the control signals of the workout with the video may include associating the control signals with timestamps of the video when the control signals are to be executed. The video and associated control signals may be published. Publishing the video and associated control signals may include delivering the video and associated control signals to exercise equipment of one or more users. Publishing the video and associated control signals may include displaying the video on a display of exercise equipment and controlling actuators of the exercise equipment using the associated control signals.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "similar," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

A. A method comprising:
    receiving a workout video at a treadmill comprising a display, an endless belt, one or more actuators configured to control a speed and incline of the endless belt, and one or more processors;

displaying, by the one or more processors, the workout video on the display, wherein the workout video includes:
audio of a song;
text of lyrics of the song;
an indication of progress through the lyrics; and
controlling, by the one or more processors, actuators of the treadmill according to control signals associated with the workout video.

B. The method of A wherein the control signals associated with the workout video are synchronized with one or more parameters of the song.

C. The method of A or B wherein the control signals are synchronized with one or more of the tempo, beat, intensity, and volume of the song.

D. The method of any of A-C wherein the control signals are synchronized with one or more changes in the tempo, beat, intensity, and volume of the song.

E. The method of any of A-D wherein the text of the lyrics of the song is shown line by line and wherein the indication of progress through the lyrics comprises highlighting each word as it is to be sung.

F. The method of any of A-E wherein the audio of the song does not include the lyrics of the song.

G. The method of any of A-F wherein the control signals may be modified, by the one or more processors, by a scaling factor in response to receiving user input at the display.

G1. The method of any of A-G further comprising querying a user, at the display, on whether the user is able to sing while exercising on the treadmill which is controlled according to the control signals.

G2. The method of any of A-G1 wherein in response to receiving an input indicating that a user cannot sing while exercising on the treadmill which is controlled according to the control signals, modifying the control signals.

G3. The method of G3 further comprising querying the user, at the display, whether the user is able to sing while exercising on the treadmill which is controlled according to the control signals and modifying the control signals until the user indicates, at the display, that the user is able to sing while exercising on the treadmill which is controlled according to the modified control signals.

H. A system comprising:
A treadmill comprising:
an endless belt;
one or more actuators;
a display;
one or more processors configured to:
receive a workout video, the workout video including:
a song;
text of lyrics of the song;
an indication of progress through the lyrics of the song;
receive control signals associated with the workout video;
display the workout video; and
control the one or more actuators according to the control signals associated with the workout video.

I. The system of H wherein the control signals associated with the workout video are synchronized with one or more parameters of the song.

J. The system of H or I wherein the control signals are synchronized with one or more of the tempo, beat, intensity, and volume of the song.

K. The system of any of H-J wherein the control signals are synchronized with one or more changes in the tempo, beat, intensity, and volume of the song.

L. The system of any of H-K wherein the text of the lyrics of the song is shown line by line and wherein the indication of progress through the lyrics comprises highlighting each word as it is to be sung.

M. The system of any of H-L wherein the audio of the song does not include the lyrics of the song.

N. The system of any of H-M wherein the control signals may be modified, by the one or more processors, by a scaling factor in response to receiving user input at the display.

O. A method comprising:
obtaining a workout video including a song;
identifying the song in the workout video;
obtaining lyrics of the song;
generating text of the lyrics of the song;
modifying the workout video by adding the text of the lyrics of the song to the workout video;
identifying parameters of the song;
automatically generating, by one or more processors, control signals based on the parameters of the song;
associating the control signals with the workout video; and
publishing the modified workout video and the associated control signals.

P. The method of O wherein the control signals associated with the workout video are synchronized with one or more parameters of the song.

Q. The method of O or P wherein the control signals are synchronized with one or more of the tempo, beat, intensity, and volume of the song.

R. The method of any of O-Q wherein the control signals are synchronized with one or more changes in the tempo, beat, intensity, and volume of the song.

S. The method of any of O-R wherein the text of the lyrics of the song is shown line by line and wherein the indication of progress through the lyrics comprises highlighting each word as it is to be sung.

T. The method of any of O-S wherein audio of the song does not include the lyrics of the song.

U. A method comprising:
receiving a playlist from a first user;
receiving workout parameters from the first user;
generating a workout based on the workout parameters;
publishing the workout to the first user and a second user;
receiving audio from the first user at first exercise equipment associated with the first user;
receiving audio from the second user at second exercise equipment associated with the second user;
playing the audio from the first user at the second exercise equipment; and playing the audio from the second user at the first exercise equipment.

V. The method of U wherein the workout parameters include at least one of a difficulty level, a workout style, a workout length, and a workout time and date.

W. The method of U or V wherein generating the workout based on the workout parameters includes adding text of the lyrics of songs in the playlist to a video of the workout.

X. The method of any of U-W wherein generating the workout includes generating control signals for controlling actuators of the first exercise equipment and the second exercise equipment.

Y. The method of any of X wherein publishing the workout to the first user and the second user includes displaying the workout on a display of the first exercise equipment and a display of the second exercise equipment and controlling actuators of the first and second exercise equipment according to the control signals.

Z. The method of any of U-Y further comprising publishing the workout to a plurality of users.

AA. A method comprising:
receiving a playlist from a first user;
receiving workout parameters from the first user;
generating a workout video based on the workout parameters, the video including text of lyrics of songs of the playlist;
displaying the workout video on a display of first exercise equipment associated with the first user; and
displaying the workout video on a display of second exercise equipment associated with a second user;

BB. The method of AA wherein the workout parameters include at least one of a difficulty level, a workout style, a workout length, and a workout time and date.

CC. The method of any of AA or BB wherein generating the workout includes generating control signals for controlling actuators of the first exercise equipment and the second exercise equipment.

DD. The method of any of AA-CC wherein publishing the workout to the first user and the second user includes displaying the workout on a display of the first exercise equipment and a display of the second exercise equipment and controlling actuators of the first and second exercise equipment according to the control signals.

EE. The method of any of AA-DD further comprising publishing the workout to a plurality of users.

What is claimed is:

1. A method comprising:
receiving, from a remote computing device, a workout video and associated control signals at a treadmill comprising a display, an endless belt, one or more actuators configured to control a speed and incline of the endless belt, and one or more processors, wherein the received control signals are synchronized with one or more parameters of a song identified using metadata of the workout video;
displaying, by the one or more processors, the workout video on the display, wherein the workout video includes:
audio of the song;
text of lyrics of the song; and
an indication of progress through the lyrics;
controlling, by the one or more processors, actuators of the treadmill based on the received control signals associated with the workout video;
capturing audio of a first user using a microphone of the treadmill;
transmitting, by the treadmill, the audio of the first user to a second user of a second treadmill based at least in part on the workout video being concurrently displayed on each of the treadmill and the second treadmill; and
playing, at the treadmill, audio of the second user captured by the second treadmill based at least in part on the workout video being concurrently displayed on each of the treadmill and the second treadmill.

2. The method of claim 1, wherein the received control signals are synchronized with one or more of a tempo, a beat, an intensity, and a volume of the song.

3. The method of claim 1, wherein the received control signals are synchronized with one or more changes in a tempo, a beat, an intensity, and a volume of the song.

4. The method of claim 1, wherein the text of the lyrics of the song is shown line by line, and wherein the indication of progress through the lyrics comprises highlighting each word as each word is to be sung.

5. The method of claim 1, wherein the audio of the song does not include the lyrics of the song.

6. The method of claim 1, further comprising:
receiving user input at the display; and
modifying, by the one or more processors, the received control signals by a scaling factor in response to the user input at the display.

7. A system comprising:
exercise equipment;
one or more actuators associated with the exercise equipment;
a display associated with the exercise equipment; and
one or more processors in communication with the display and configured to:
receive a workout video, the workout video including:
audio of a song;
text of lyrics of the song; and
an indication of progress through the lyrics of the song;
receive, from a remote computing device, control signals for the one or more actuators and associated with the workout video, wherein the received control signals are synchronized with one or more parameters of the song identified using metadata of the workout video;
display the workout video on the display;
control the one or more actuators according to the received control signals associated with the workout video;
capture audio of a first user using a microphone of the exercise equipment;
transmit, by the exercise equipment, the audio of the first user to a second user of a second exercise equipment based at least in part on the workout video being concurrently displayed on each of the exercise equipment and the second exercise equipment; and
play, at the exercise equipment, audio of the second user captured by the second exercise equipment based at least in part on the workout video being concurrently displayed on each of the exercise equipment and the second exercise equipment.

8. The system of claim 7, wherein the control signals are synchronized with one or more of a tempo, a beat, an intensity, and a volume of the song.

9. The system of claim 7, wherein the control signals are synchronized with one or more changes in a tempo, a beat, an intensity, and a volume of the song.

10. The system of claim 7, wherein the text of the lyrics of the song is shown line by line, and wherein the indication of progress through the lyrics comprises highlighting each word as each word is to be sung.

11. The system of claim 7, wherein the audio of the song does not include the lyrics of the song.

12. The system of claim 7, wherein the one or more processors are further configured to:
modify the control signals by a scaling factor in response to user input received at the display.

13. A method comprising:
receiving a playlist from a first user;
receiving workout parameters from the first user;

generating, at a remote computing device, a workout based on the workout parameters and the playlist, wherein generating the workout comprises generating a workout video that includes one or more songs of the playlist and associated control signals for controlling actuators of a first exercise equipment and a second exercise equipment, and wherein the associated control signals are synchronized with one or more parameters of the one or more songs that are identified using metadata of the workout video, and wherein the generated workout is stored in a memory of the remote computing device;

publishing the workout to the first user and a second user, wherein publishing the workout includes transmitting, from the remote computing device, the workout video and the associated control signals to the first exercise equipment associated with the first user and the second exercise equipment associated with the second user;

receiving audio from the first user at the first exercise equipment associated with the first user;

receiving audio from the second user at the second exercise equipment associated with the second user;

playing the audio from the first user at the second exercise equipment based at least in part on publishing the workout to the first user and the second user; and playing the audio from the second user at the first exercise equipment based at least in part on publishing the workout to the first user and the second user.

14. The method of claim 13, wherein the workout parameters comprise at least one of a difficulty level, a workout style, a workout length, and a workout time and date.

15. The method of claim 13, wherein generating the workout based on the workout parameters comprises:
adding text of lyrics of songs in the playlist to a video of the workout.

16. The method of claim 13, wherein publishing the workout to the first user and the second user comprises:
displaying the workout on a display of the first exercise equipment and a second display of the second exercise equipment; and
controlling actuators of the first exercise equipment, the second exercise equipment, or both according to the associated control signals.

17. The method of claim 13, further comprising:
publishing the workout to a plurality of users.

* * * * *